US012009554B2

(12) United States Patent
Gromadskyi et al.

(10) Patent No.: US 12,009,554 B2
(45) Date of Patent: Jun. 11, 2024

(54) SEPARATOR PLATE FOR A FUEL CELL, PRECURSOR THEREFORE AND ITS METHOD OF PRODUCTION

(71) Applicant: BLUE WORLD TECHNOLOGIES HOLDING APS, Aalborg OST (DK)

(72) Inventors: Denys Gromadskyi, Ellidshoj (DK); Larysa Hromadska, Ellidshoj (DK)

(73) Assignee: BLUE WORLD TECHNOLOGIES HOLDING APS, Aalborg Ost (DK)

( * ) Notice: Subject to any disclaimer, the term of this patent is extended or adjusted under 35 U.S.C. 154(b) by 0 days.

(21) Appl. No.: 17/999,468

(22) PCT Filed: Jun. 1, 2021

(86) PCT No.: PCT/DK2021/050168
§ 371 (c)(1),
(2) Date: Nov. 21, 2022

(87) PCT Pub. No.: WO2021/244719
PCT Pub. Date: Dec. 9, 2021

(65) Prior Publication Data
US 2023/0197977 A1    Jun. 22, 2023

(30) Foreign Application Priority Data

Jun. 4, 2020   (DK) .......................... PA 2020 00656
Dec. 30, 2020  (DK) .......................... PA 2020 01469

(51) Int. Cl.
*H01M 8/0226*   (2016.01)
*H01M 8/0213*   (2016.01)
*H01M 8/0221*   (2016.01)

(52) U.S. Cl.
CPC ....... *H01M 8/0226* (2013.01); *H01M 8/0213* (2013.01); *H01M 8/0221* (2013.01)

(58) Field of Classification Search
CPC ............. H01M 8/0226; H01M 8/0213; H01M 8/0221; H01M 8/0202; Y02E 60/50; Y02P 70/50
See application file for complete search history.

(56) References Cited

U.S. PATENT DOCUMENTS 5,043,112 A    8/1991   Beck
6,544,680 B1   4/2003   Takano et al.
(Continued)

FOREIGN PATENT DOCUMENTS

CN    101174695 A    5/2008
CN    111048800 A    4/2020
(Continued)

OTHER PUBLICATIONS

Lin X, et al.; Review of bipolar plates in PEM fuel cells: Flow field designs. International Journal of Hydrogen Energy 30, 2005, pp. 359-371.
(Continued)

*Primary Examiner* — Daniel S Gatewood
(74) *Attorney, Agent, or Firm* — Brooks Kushman P. C.; John E. Nemazi

(57) ABSTRACT

For production of a separator plate in a fuel cell, a malleable precursor sheet is made by mixing thermoplastic polymer, carbon fibers, and electroconductive carbon particles, which is then hot-compression molded as a single layer or multi-layer structure or multi-layer structure, where the layer thickness is less than the length of the carbon fibers.

19 Claims, 7 Drawing Sheets

(56) References Cited

U.S. PATENT DOCUMENTS

| | | | |
|---|---|---|---|
| 6,803,139 | B2 | 10/2004 | Saito et al. |
| 7,736,786 | B2 | 6/2010 | Hong et al. |
| 7,887,927 | B2 | 2/2011 | Jang et al. |
| 7,910,501 | B2 | 3/2011 | Jiang et al. |
| 8,563,681 | B2 | 10/2013 | Makita et al. |
| 2004/0033413 | A1 | 2/2004 | Yoon et al. |
| 2005/0042496 | A1 | 2/2005 | Bisara et al. |
| 2006/0084750 | A1 | 4/2006 | Huang et al. |
| 2008/0318110 | A1 | 12/2008 | Budinski et al. |
| 2009/0152105 | A1 | 6/2009 | LaConti et al. |
| 2014/0087287 | A1* | 3/2014 | Suzuki ............... H01M 8/0247 429/479 |
| 2015/0367249 | A1 | 12/2015 | Miyata et al. |
| 2017/0298200 | A1 | 10/2017 | Yi et al. |
| 2017/0373329 | A1 | 12/2017 | Minamiura et al. |
| 2018/0358630 | A1 | 12/2018 | Woo et al. |
| 2019/0260037 | A1* | 8/2019 | Gromadskyi ....... H01M 8/0226 |
| 2019/0341630 | A1 | 11/2019 | Ando et al. |

FOREIGN PATENT DOCUMENTS

| | | |
|---|---|---|
| EP | 2871697 A1 | 5/2015 |
| EP | 1758185 B1 | 10/2018 |
| JP | 2013120737 A | 6/2013 |
| WO | 2008075812 A1 | 6/2008 |
| WO | 2014100082 A1 | 6/2014 |
| WO | 2018072803 A1 | 4/2018 |

OTHER PUBLICATIONS

Devrim Y, et al.; Experimental investigation of CO tolerance in high temperature PEM fuel cells; International Journal of Hydrogen Energy 43 (2018).

Yan W. et al.: Comparison of performance degradation of high-temperature PEM fuel cells with different bipolar plates; Energy 186 (2019) 115836.

Simaafrookhteh S, et al; Fabrication of multi-filler thermoset-based composite bipolar plates for PEMFCs: Molding defects and properties characterizations; International Journal of Hydrogen Energy 45 (2020) 14119.

Guo N, et al.; Effect of different graphite materials on the electrical conductivity and flexural strength of bipolar plates fabricating using selective laser sintering; International Journal of Hydrogen Energy 37 (2012) 3558.

Singh R. et al.; Graphene-based bipolar plates for polymer electrolyte membrane fuel cells; Frontiers of Materials Science 13 (2019) 217.

Yen C. et al.; Preparation and properties of high performance nanocomposite bipolar plate for fuel cell; Journal of Power Sources 162 (2006) 309.

Rzeczkowski P. et al.; Development of joining methods for highly filled graphite/PP composite based bipolar plates for fuel cells: Adhesive joining and welding. Proceedings of the 33rd International Conference of the Polymer Processing Society; Cancun, Mexico, Dec. 10-14, 2017.

Cunningham B, et al.; The development of economical bipolar plates for fuel cells; Journal of Materials Chemistry 16 (2006) 4385.

Rafiuddin et al,; Fabrication and characterization of bipolar plates of vinyl ester resin/graphite-based composite for polymer electrolyte membrane fuel cells; Journal of Thermoplastic Composite Materials 29 (2014) 1315.

Cunningham B. et al.; Development of bipolar plates for fuel cells from graphite-filled wet-lay material and a compatible thermoplastic laminate skin layer; Journal of Power Sources 168 (2007) 418.

Gromadskyi D, et al.; Correlation of energy storage performance of supercapacitor with iso-propanol improved wettability of aqueous electrolyte on activated carbon electrodes of various apparent densities; Applied Energy 159 (2015) 39.

Lequeux F. et al.; Wetting of polymers by their solvents; The European Physical Journal E 39 (2016) 12.

Sunitha K. et al.; Separation of NMP/water mixtures by nanocomposite PEBA membrane: Part I. Membrane synthesis, characterization and pervaporation performance; Desalination 330 (213) 1.

Li X. et al.; High-resolution thermogravimetry of polyphenylene sulfide film under four atmospheres; Journal of Applied Polymer Science 83 (2002) 2053.

Cebe P. et al.; Melting behaviour of high performance composite matrix polymers: Poly(phenylene sulfide); Polymer Composites 11 (1990) 265.

Wang H. et al.; Effect of scretching ratio and heating temperature on structure and performance of PTFE hollow fiber membrane in VMD for RO brine; Separation and Purification Technology 126 (2014) 82.

Menczel J. et al.; Thermal analysis of poly(phenylene sulfide) polymers I: Thermal characterization of PPS polymers of different molecular weights; Polymer Engineering and Science 32 (1992) 1264.

Marinho B. et al.; Electrical conductivity of compacts of graphene, multi-wall carbon nanotubes, carbon black and graphite powder; Powder Technology 221 (2012) 351.

Mijajlovikj M. et al.; Mathematical model on flexural properties of composite laminates; International Journal of Engineering Research & Technology 6 (2017) 526.

Yang T. et al.; Study on the mesocarbon microbeads/polyphenylene sulfide composite bipolar plates applied for proton exchange membrane fuel cells; Journal of Power Sources 175 (2008) 390.

Zhang H. et al.; Technology of polyphenylene sulfide (PPS) resin/graphite conductive composite for bipolar plate; Key Engineering Materials 519 (2012) 49.

Zhang H. et al.; Preparation of CF reinforced PPS/graphite conductive composite for bipolar plate; Advanced Materials Research 875-877 (2014) 1245.

Xia L. et al.; Effects of resin content and preparing conditions on the properties of polyphenylene sulfide resin/graphite composite for bipolar plate; Journal of Power Sources 178 (2008) 363.

Wang H. et al;. Stainless steel as bipolar plate material for polymer electrolyte membrane fuel cells; Journal of Power Sources 115 (2003) 243.

Kopietz L. et al.; Highly flexible bipolar plates for redox- flow batteries; International Conference on Carbon Materials and Technology (2018).

International Search Report for PCT/DK2021/050168, prepared by the Nordic Patent Institute, mailing date Aug. 16, 2021, 4 pages.

Reading Plastic Machining and Fabrication; The advanced properties of PPS materials; https://readingplastic.com/pps-materials; (2018).

Wilson A. et al; DOE; Hydrogen and fuel cell program record 2017; https://www.energy.gov/eere/fuelcells/; (2017).

Fuelcellsworks; Horizon Announces a Breakthrough in Ultra-Thin High Performance Graphite Bipolar Plate Technology for Fuel Cells; https://fuelcellsworks.com/news/horizon-announce-a-breakthrough-in-ultra-thin-high-perfor-mance-graphite-bip/; (2018).

SGL Group; Sigracell® bipolar plate; https://www.sglcarbon.com/pdf/SGL-Datasheet-SIGRACELL-Bipolar-Plates-EN.pdf ; (2017).

Fraunhofer Umsicht; Highly flexible bipolar plates for redox-flow batteries: https://www.umsicht.fraunhofer.de/content/dam/umsicht/en/documents/research-for-the-market/electrically-conductive-polymers/highly-flexible-bipolar-plates-redox-flow-batteries.pdf ; (2018).

Toray; Torelina™ PPS resin; /www.toray.jp/plastics/en/torelina/technical/tec_023.html; (date unknown).

Poly Fluoro Ltd; Tensile testing of PTFE; https://polyfluoroltd.com/blog/tensile-testing-of-ptfe/ (2019).

Performance Plastics ; Highly engineered thermoplastic materials ; https://www.performanceplastics.com/materials/; (date unknown).

Dupont; Teflon® PTFEDISP 30 fluoropolymer resin; http://download.ceris.purdue.edu/file/3187 (2011).

SIA—Comments on the preliminary information on manufacturing, processing, distribution, use, and disposal: N-methylpyrrolidone (NMP); https://www.semiconductors.org/wp-content/uploads/2018/06/SIA-Comments-to-EPA-on-N-Methylpyrrolidone-NMP-March-15-2017.pdf; (2017).

Eastman; N-Methyl-Pyrrolidone (NMP); www.eastman.com/Pages/ProductHome.aspx?product=71103627 (2017).

(56) References Cited

OTHER PUBLICATIONS

Fisher Scientific; Thermo Scientific Chemicals Triton X-100 250ML ; https://www.fishersci.com/shop/products/triton-x-100-acros-orga-nics-4/AC215682500; (date unknown).
Polymer Database; Polyphenylene sulfide (PPS): http://polymerdatabase.com/Commercial%20Polymers/PPS.html; (2015-2022).
Freudenberg; Freudenberg gas diffusion layers; https://www.fuelcellstore.com/spec-sheets/freudenberg-gdl-tech-nical-data.pdf (2021).
ASTM Designation: F84-98; Standard Test Method for Measuring Resistivity of Silicon Wafers With an In-Line Four-Point Probe (1975).
ASTM D790-17 ; Standard Test Methods for Flexural Properties of Unreinforced and Reinforced Plastics and Electrical Insulating Material; https://www.astm.org/Standards/D790; (2017).
Fuel Cells Bulletin; Horizon Announces a Breakthrough in Ultra-Thin High Performance Graphite Bipolar Plate Technology for Fuel Cells; (2019).

\* cited by examiner

Cross section of BPP without electroconductive additives

Cross section of BPP with electroconductive additives

SEPARATOR PLATE FOR A FUEL CELL, PRECURSOR THEREFORE AND ITS METHOD OF PRODUCTION

CROSS-REFERENCE TO RELATED APPLICATION

This application is the U.S. national phase of PCT Application No. PCT/DK2021/050168 filed on Jun. 1, 2021, which claims priority to DK Patent Application No. PA 2020 00656 filed on Jun. 4, 2020 and DK Patent Application No. PA 2020 01469 filed on Dec. 30, 2020, the disclosures of which are incorporated in their entirety by reference herein.

FIELD OF THE INVENTION

The present invention relates to separator plates, for example bipolar plates, for fuel cells. It also relates to a precursor for hot-compression molding of such separator plate and for its production.

BACKGROUND OF THE INVENTION

Bipolar plates (BPPs) are key components for fuel cell stacks, as they separate single membrane-electrode assemblies and deliver fuel to the membrane [Ref. 1]. High-temperature proton-exchange membrane (PEM) fuel cells have great advantages as compared to low-temperature PEM fuel cells due to their high tolerance to impurities in the input gases, especially tolerance to carbon monoxide residues in hydrogen gas [Ref. 2]. However, the relatively high operating temperatures in the range of 160-200° C. and the acidic media set strict limits for those materials that are suitable to be used in bipolar plates [Ref. 3]. Graphite seems very attractive as a material due to its high electrical and thermal conductivity as well as good chemical stability [Ref. 4]. Other carbon materials such as carbon black (CB), carbon fibers (CFs), carbon nanotubes (CNTs), and graphene can be utilized as additives to the compound material for the BPP in order to improve the mechanical and electrical properties [Ref. 5, 6]. However, in order to hold the carbon particles together, use of binding materials, e.g. thermoplastic polymers, is needed. Polyphenylene sulfide (PPS) is a good candidate, as it fulfills all strict requirements for high-temperature PEM fuel cell, including being chemically inert, having a high service temperature of above 200° C., and having good mechanical properties [Ref. 7].

Alternative BPP structures are disclosed in CN111048800A [Ref. 58] and U.S. Pat. No. 7,887,927 [Ref 59], where multi-layer BPPs are produced by stacked carbon fiber sheets or graphite sheets with an electro-conductive polymeric filler in between.

The Department of Energy (DoE) of the United States declared high 2020 targets for BPPs utilized in transportation applications, among which is the requirement that the areal-specific resistance should be less than 10 m$\Omega$·cm$^2$, while flexural strength must exceed 25 MPa [Ref 8]. It should be noted here that, normally, for graphite-based BPPs, the thickness is around 1.5-3 mm [Ref. 9-12]. However, the newest research work demonstrates graphite BPP samples based on graphite compounds having thicknesses below 1 mm, e.g. 0.85 mm in [Ref 13], 0.6 mm in [Ref. 14] or even 0.4 mm in [Ref. 15], which gives some benefits, such as more compact fuel cell design and cost reduction because of lower material consumption. In order to produce thin BPPs from a powdered compound, a multi-step process is disclosed in [Ref 16]. It would be desirable to provide a simple but efficient process for mass production of BPPs.

There are few patents and research manuscripts that are describing processes for the preparation of carbon/PPS compounds and corresponding BPPs [Ref. 17-20]. For example, in international patent application WO2014/100082 [Ref 17], PPS is mixed with carbon nanotubes (CNTs) in a hot extruder in which the polymer is melted. Normally, high polymer loading is needed for an extrusion process, typically more than 50 wt. %, which, unfortunately, has negative impact on the electrical properties of such compounds. After extrusion, the PPS-based compound can be formed into the sheets, for example as it is proposed in U.S. Pat. No. 7,736,786 [Ref. 18].

Chinese patent application CN101174695A [63] discloses a dry method for producing a BPP made of a material containing 45-55% graphite, 5-10% carbon fiber, 30-40% PPS and 5-10% fluoropolymer resin, for example PTFE. The flow field structure has a depth of 0.5-1.5 mm, inside a sheet having a thickness in the order of 5 mm. The carbon fiber length is in the range of 10-200 micrometer. A powder mix is first cold pressed at 3-5 MPa and then slowly heated to 310-330° C. and pressed at 15-25 MPa for compaction for 30 minutes, after which it is quickly cooled in water for preventing crystallinity and increase toughness.

US2014/087287 [Ref. 60] discloses a dry method for manufacturing separator plates for a fuel cell, wherein the separator plate is made of two sheets, A and B. The sheet A comprises 100 parts of thermoplastic resin and 130-3200 parts of carbonaceous material, and the sheet B comprises 100 parts of thermoplastic resin, for example polypropylene, and 3-280 parts carbonaceous material. Half of the carbonaceous material is fibrous carbon. The fiber length is in the range of 0.001-20 mm, more preferably 1-10 mm, and exemplified with 6 mm. The sheets are molded by compression of the powder mix at a temperature of 60 degrees higher than the higher of the melting points of their respective binder components. Groove depths were in the final plate were 0.3 and 0.5 mm in a 1 mm thick separator.

US2019/0341630 [Ref. 61] discloses a production method for fuel cell separators, for example with a thickness of 1 mm. In the method, carbon fibers are dispersed with fibrous resin in water dispersion, after which the slurry is dried to obtain a paper-like composite sheet, into which as a next step carbon particles are pressed at elevated temperature. The length of the carbon fibers is not limited but, for example, in the range of 20 micrometer to 6 mm, and exemplified by 3 mm for a 2 mm thick composite sheet.

US2009/0152105 [Ref. 62] discloses a production method of a compression pad in a fuel cell, in which 1 inch long carbon fibers are blended into molten PTFE, which is then hardened and chopped in a coffee grinder. The blend is then mixed with PVDF and heated to 200° C. while compressed. Alternatively, the carbon fibers are molten into the PVDF. Carbon fibers are preferably 3 mm long (⅛ inch). Typical thicknesses of the pads are 10-15 mils, roughly corresponding to 0.25-0.40 mm.

WO2008/075812 [Ref 64] discloses a hydrophilic polymer composite for a bipolar plate comprising a carbon black aggregate with hybrid particles embedded on the surface of carbon black particles.

US2019/0341630 [Ref. 61] discloses a production method for fuel cell separators, for example with a thickness of 1 mm. In the method, carbon fibers are dispersed with fibrous resin in water dispersion, after which the slurry is dried to obtain a paper-like composite sheet, into which as a next step carbon particles are pressed at elevated temperature. The length of the carbon fibers is not limited but, for example, in the range of 20 micrometer to 6 mm, and exemplified by 3 mm for a 2 mm thick composite sheet.

US2009/0152105 [Ref. 62] discloses a production method of a compression pad in a fuel cell, in which 1 inch long carbon fibers are blended into molten PTFE, which is then hardened and chopped in a coffee grinder. The blend is then mixed with PVDF and heated to 200° C. while compressed. Alternatively, the carbon fibers are molten into the PVDF. Carbon fibers are preferably 3 mm long (⅛ inch). Typical thicknesses of the pads are 10-15 mils, roughly corresponding to 0.25-0.40 mm.

US2018/0358630 [Ref. 65] discloses a manufacturing method for a bipolar plate where two types of carbon powder with different powder size are mixed and compression molding is used. US2004/033413 [Ref 66] discloses a polymer electrolyte membrane a fuel cell, where the membrane has an electroconductive coating. US2017/298200 [Ref 67] discloses a thermoplastic prepreg intermediate material for a fuel cell separation plate and a method for manufacturing the thermoplastic prepreg, where the is compressed at a higher temperature than the melting point of the polymer.

Wet processes, for example as described in [Ref. 19] and in US2019/0341630 [Ref. 20], imply mixing of graphite, carbon fibers, and PPS binder in liquid phase, in particular in water, before the solid mixture is filtered and formed into sheets for their further drying and molding into the BPPs. However, disadvantageously, PPS is very poorly wetted by water, as it can only take up ca. 0.1% water at 23° C. after 500 h [Ref 21]. Accordingly, it is a challenge to disperse PPS in aqueous media without agglomeration of its particles. Probably, this is why highly diluted dispersions are applied in [Ref. 19, 20], where the total solid content does not exceed 10 wt. %, and is kept preferably in the range of 1-3 wt. %.

A process of making sheets from powdered compounds, prepared by dry mixing of graphite and PPS, is also proposed in [Ref. 22], where the mixed compounds are dispersed together with another thermoplastic polymer, namely polytetrafluoroethylene (PTFE), in iso-propanol, which is good surfactant for wetting hydrophobic surfaces [Ref 23]. An increase of the temperature up to the boiling point of alcohol leads to a rapid coagulation of PTFE, forming a pliable and malleable material, similar to a dough-like structure, see US2019/0260037 [Ref 22], because the PTFE has an ability to high elongation compared to other polymers, seeing that it can reach 550% [Ref. 24].

In the patent literature, various processes are disclosed in relation to handling PPS, for example U.S. Pat. No. 8,563, 681 [Ref. 30], and for forming articles therefrom, for example U.S. Pat. No. 5,043,112 [Ref 27], as well as production of BPPs, for example US2008/0318110 [Ref 31] and US 2006/0084750 [Ref. 50].

U.S. Pat. No. 6,544,680 [Ref 54] discloses molded separator plates with carbon and PPS with the addition of a thermosetting resin. U.S. Pat. No. 6,803,139 [Ref. 55] discloses molded separator plates with carbon and a thermoplastic, for example polyphenylene sulfide (PPS) and with the addition of carbodiimide. EP1758185 [Ref 56] discloses molded separator plates with 84% carbon, 2% PTFE, 14% epoxy that is cured in the hot press. Polyphenylene sulfide (PPS) or Polytetrafluoroethylene (PTFE) are mentioned as thermoplastic resins but not exemplified. US2005/0042496 [Ref 57] discloses a continuous process in which polymer is blended with a filler, for example graphite, kneaded and extruded before transferred into a form, in which it is compacted, for example into a separator plate.

International patent application WO2018/072803 [Ref. 53] discloses a production method for separator plates, in which a powder mix of carbon and a thermoplastic polymer is suspended in alcohol and mixed with a water suspension of PTFE, after which liquid is evaporated, and the final malleable slurry is rolled into a sheet and press molded into a separator plate. Examples of carbon powder includes graphite, carbon black, graphene, carbon nanotubes or amorphous carbon.

As compared to pressed powdered compounds for BPPs, the use of malleable sheets or slabs for molding of BPPs appear beneficial in terms of easier storing, handling, and dosing as well. However, in order for this method as well as the resulting BPPs to be optimized, further improvements are desirable, in particular with respect to the targets as set in the USA DOE's 2020 program. In order to be successful as production method also ease, costs and speed of production are important factors that need consideration.

DESCRIPTION/SUMMARY OF THE INVENTION

It is an objective of the invention to provide an improvement in the art. In particular, it is an objective to provide improved separator plates, such as BPPs, and improved fuel cells with such separator plates. A further objective is to provide an improved method for providing separator plates, such as BPPs, and an improved material mix of carbon and polymer and a corresponding precursor for the pressure molding of separator plates. This is achieved with a method for production as described in the claims and in the following as well as with a precursor for hot-compression molding of a separator plate, such as a BPP.

This objective is achieved by a process of making a graphite-based compound with thermoplastic polymers therein as well as a moldable, malleable, precursor sheet thereof for hot-compression molding into an electrically conductive, rigid separator plate for a fuel cell, such as BPPs.

Although, the invention is targeting production of BPPs for the use in fuel cell stacks, it is equally valid for producing separator plates in general, as the process and material applied equally well. Especially, the method is likewise useful for the production of single electrode plates for fuel cells as well as end plates for a fuel cell stack. Examples of configurations are given in WO2018/072803 [Ref 53]. For example, the separator plate is a bipolar plate with fluid flow fields on opposite sides, in particular a flow field for oxygen on one side and a flow field for hydrogen on the opposite side. Alternatively, a separator plate for a fuel cell stack comprises on one side a flow field for oxygen gas, such as air, and is attached with its opposite side, for example attached back-to-back, to a second separator plate that contains a flow field for hydrogen-gas. Optionally, there is provided a cooling flow field for coolant between the two separator plates for the fuel gases, for example by insertion of a corresponding separator plate with a coolant flow field on one or both of its sides. Optionally, the separator plate has a flow field for oxygen on one side and a flow field for coolant on its opposite side. Depending on the need, the method as explained herein can be used to produce a variety of different separator plates, be it with a fluid flow field only on one side or on both sides, be it for oxygen, hydrogen, or coolant in the respective flow field.

In short, as a general aspects, for production of such separator plate in a fuel cell, a malleable precursor sheet is made by mixing thermoplastic polymer, carbon fibers, and electroconductive carbon particles, where the precursor is then hot-compression molded as a single layer or multi-layer structure that makes up the separator plate. Advantageously, as will be discussed below, the layer thickness is less than the average length of the carbon fibers. Details are described in the following.

The compound is provided as a polymer matrix that comprises a thermoplastic polymer blend in which carbon fibers and electroconductive carbon particles are dispersed. The thermoplastic polymer blend comprises PTFE and a thermoplastic polymer different from PTFE, for example polyphenylene sulfide (PPS).

Alternatives for PPS include ethylene tetrafluoroethylene (ETFE), fluorinated ethylene propylene (FEP), perfluoroalkoxy alkane (PFA), polyamideimide (PAI), polychlorotrifluoroethylene (PCTFE), polyether ether ketone (PEEK), polyetherketone (PEK), polyetherimide (PEI), polyethersulfone (PES), polyphenylsulfone (PPSU), polysulfone (PSU), or polyvinylidene fluoride (PVDF).

Herein and in the following, all stated weight percentages are given relatively to the total weight of the polymer blend, carbon fibers, and carbon particles. Thus, liquids used in the production process, such as water and organic solvents, as well as liquid additives, for example surfactants, are not taken into regard, as these are evaporated prior to the final production step.

For example, the precursor and the final separator plate comprises one or more of the following parameters, of which two, three or more can be combined successfully:
  PTFE: at least 0.05 wt. %
  PTFE: less than 0.5 wt. %
  Thermoplastic polymer different from PTFE: minimum 5-30 wt. %
  Carbon fibers relative weight: 2-20 wt. %, for example 5-20%
  Carbon fibers average length L: 0.1-1 mm
  Carbon particles (different from carbon fibers) relative weight: 25-90 wt. %
  Carbon particles (different from carbon fibers) average size: 0.1-100 µm.

The sizes given herein for polymer particles and carbon particles, including graphite and carbon black, are average sizes, which means averaged over the three dimensions of the particles as well as over the number of particles of this specific group or type.

Typically, for the particles, the statistical distribution related to the dimensionally-averaged sizes, including the length of the carbon fibers, have a FWHM lower than or in the order of ±20%.

The compound is formed into a moldable, malleable precursor sheet in a forming station, for example a stationary forming station. However, advantageously, the forming station is a calender rolling station, and the forming comprises press-rolling the sheet by calender rollers the calender rolling station.

The precursor sheet is optionally formed as a single layer slab with a thickness $X1$ and then molded into a single layer separator plate. Alternatively, the precursor sheet is formed as a multilayer slab structure with a plurality of layers with thickness $X1$ in stacked condition. Typically, the precursor is cut into shape before the molding, and the resulting slab is then hot-compression molded into a separator plate.

For the multilayer separator plate, the multilayer slab of the precursor is made up by the plurality of layers of thickness $X2$, but this is not necessary, as there may be additional layers of a different thickness added to the plurality of layers with thickness $X2$, for example a thicker top layer and bottom layer between which a plurality of layers with thickness $X2$, typically identical layers, are provided.

The terminology of the thickness $X1$ of the precursor slab and the corresponding thickness $X2$ of the separator plate is used for differentiation, as the compression stage increases the density of the slabs due to the high pressure compaction. Whereas the thickness $X1$ of a slab applies for the precursor slab before molding, the thickness $X2$ applies for the separator plate after molding of the slab. For example, the density from the slab to the final separator plate, such as BPP can increase by a factor of 2. However, it is also pointed out that the formation of flow fields during the compression molding may compensate somewhat for the decrease in thickness.

Optionally, the number of the plurality of layers is in the range 2-10, for example 4-8. However, more layers are possible.

Advantageously, and as will be discussed in more detail below, the thickness $X1$ is smaller than the average length L of the carbon fibers. This is advantageous, as it causes the carbon fibers to be at least partially parallel with the slab, especially during the rolling process, which increases mechanical strength of the final separator plate. For example, the average length L is at least twice as large as the thickness $X1$ of the precursor sheet.

When comparing the length L of the carbon fibers to the thickness $X2$ of the separator plate, it is also valid to assume that this thickness $X2$ should be less than the average length L of the carbon fibers, however, rather at least two times less than L, or even at least four times less than L, which is due to the compaction of the precursor during compression molding.

The selection of the length of the carbon fibers is a balance between positive influence on the strength of the final separator plate and the ability to get the carbon fibers dispersed, which is easiest for short carbon fibers. From these perspectives, an average length for the carbon fibers has been found useful if in the range of 0.05-1 mm, for example 0.1-1 mm.

For example, if the carbon fibers have a length of 1 mm, and the requirements is that the carbon fibers are at least twice as long as the thickness of the precursor sheet, the maximum sheet thickness has to be chosen to 0.5 mm.

Lengths for the fibers are average lengths, but it is assumed that the lengths are not deviating substantially from the average value. For example, less than 20% of the fibers have a length deviating more than 20% of the average length.

The selection of the length of the fibers is dependent on the thickness of the final separator plate.

In other words, when the length L is selected to be two times larger than the thickness $X1$ of the precursor, it will typically be in the order of four times larger than the thickness $X2$ of the final separator plate, due to the compaction during molding.

When mixing the carbon fibers in the initial dispersions, the fibers should not be too long, which would make mixing difficult. For example, 6 or 10 mm long fibers, as disclosed in the prior art US2014/087287, US2019/0341630, and US2009/0152105 would be disadvantageously long when producing a separator plate with a thickness $X2$ of 0.05-0.3 mm. On the other hand, fiber lengths of 0.01 mm or 0.02 mm as disclosed in the same prior art would be too short. Accordingly, the ranges as suggested by the prior art appear rather arbitrary and do not express the considerations of balancing between proper mixing and with increase of strength.

Also, the amount of carbon fibers in the compound should not be arbitrarily chosen. It has been experimentally verified that strength of the final separator plate increased for increasing amount of carbon fibers until 10 wt. %, however with a slower increase in the range 7-10 wt. %. For higher amounts than 10 wt. %, the flexible strength was found to decrease. For this reason, the amount of 5-20 wt. %, for example 5-15 wt. %, appears most useful, with an optimum range within 6-12 wt. %, for example 6-10%.

As discussed in the introduction, thin separator plates are desirable, as they influence size, weight, performance, and cost of the final fuel cell stack. For example, the thickness X2 of the separator plates are in the range of 0.05-1 mm, for example in the range of 0.05-0.5 mm or 0.05-0.6 mm or even 0.05-0.3 mm, however, potentially made as multilayers.

For example, the thickness X1 of the precursor sheet is in the range of 0.05-1 mm, for example 0.1-1 mm or 0.05-0.5 mm, 0.05-0.6 mm, optionally 0.1-0.6 mm or even 0.05-0.3 mm. For multi-layer separators, the thickness X1 per layer is typically in the lower end thereof, for example in the range of 0.05-0.3 mm, optionally 0.05-0.2 mm.

The following method of production of the precursor sheet has been found advantageous. In this method, an aqueous dispersions and a solvent dispersion are provided and mixed. The aqueous dispersion comprises PTFE particles and the carbon fibers, and optionally a first portion of graphite particles, for example having an average particle size in the range of 0.1-10 μm.

The solvent dispersion comprises the second thermoplastic particulate polymer that is different from PTFE, for example PPS, as well as carbon black particles, which are more hydrophobic than graphite particles in the mix.

The organic solvent is optionally N-methylpyrrolidone, NMP. Alternative solvents are also possible to use, for example N,N-dimethyl acetamide, N,N-dimethylformamide, and dimethyl sulfoxide.

Both dispersions are stirred for preventing sedimentation of the particles and then combined and mixed.

Further, graphite particles are mixed into the mix dispersions, for example having an average size in the range of 10-100 μm. Typically, the portion of these graphite particles has a weight which is 5-20 times larger than the weight of the carbon black.

It has been found advantageous to use two portions of graphite in the mix, with a first portion having a smaller particle size than a second. As already mentioned, the first portion is advantageously mixed into the first dispersion. The second portion of graphite particles is advantageously mixed with the mixed two dispersions. For example, the graphite particles of the second portion are having an average size in the range of 10-100 μm. This second portion is relatively large as compared to the first portion and the amount of carbon black. Typically, the second portion has a weight which is 5-20 times larger than the sum of the weight of the first portion and the weight of the carbon black.

This large amount of graphite makes further stirring difficult, why the proper blending is performed in a kneader.

During kneading in the kneader, the temperature is raised to elevated temperature levels sufficiently high for evaporating the organic solvent and water from the mix. Furthermore, by increasing the temperature to levels above the glass transition temperature of PTFE but below the melting temperature of PTFE, the kneading leads to fibridization of the PTFE, which is advantageous for the strength of the final separator plate.

In an advantageous process, the elevated temperature levels during the kneading in the kneader are below the melting temperatures of the PTFE and the second thermoplastic polymer. Although, it is possible to increase the temperature of the mix in the kneader to above the melting temperature of the second thermoplastic polymer, it has been found more advantageous to melt the second thermoplastic polymer after extraction of the mix from the kneader. Accordingly, only after extraction, the temperature of the mix is raised to a level sufficiently high to melt the second thermoplastic polymer before forming the sheet into a slab with thickness X1 in the forming station.

For example, there is provided a conveyor between the kneader and the rolling station, in which the heating of the compound for the melting of the second thermoplastic polymer is done so that second thermoplastic polymer is in a molten state when the mix is formed into a sheet in a forming station, for example calender rolling station.

For example, after the forming station, the sheet is cut into a slab with the right dimensions for the hot-compression molding in an inline process which includes the kneader and the forming station. Optionally, a plurality of slabs is stacked into a multilayer slab for producing a multi-layer separator plate.

For very thin precursor sheets, several rolling stages are provided in the rolling station. In experiments, successful production of sheets with a thickness X1 of 0.05 mm has been achieved with a roller station having 6 rolling stages. In such performed experiments, the carbon particles have an average size of 20 μm, so that the 0.05 mm thickness X1 of the sheet was at the theoretical lower limit for a sheet with such particles.

In experiments for successful multilayer separator plates, six of thin precursor sheets with a thickness 1 of 0.1 mm of were cut and stacked into a 0.6 mm thick slab that was used for the hot-compression molding into a separator sheet, especially a BPP, having a final thickness X2 of 0.3 mm.

Notice that such thin precursor sheets with a thickness X1 of 0.05-0.1 mm cannot be produced by pressing a powder mix of carbon particles and polymer particles. One of the factors for successfully producing thin plates is the fibridization of the PTFE during the kneading process, which is why the kneading is an important stage for the production.

Alternative, the sheet is provided as a quasi-endless sheet with thickness X1, which is cooled to solidify and then rolled onto a roll for storage until the final shaping, for example by cutting, prior to hot-compression molding. Optionally, the quasi-endless sheet after storage is cut into slabs that are stacked into a multilayer slab for producing a multi-layer separator plate.

Calender rolling has proven to be advantageous for aligning the carbon fibers at least partially into a direction parallel to the surface.

Furthermore, it has turned out that calender rolling of the slab in different directions tend to align the fibers in different directions. This is surprising in that not only the last calender rolling step determines the direction of the fibers but also the previous steps. It is believed that subsequent calender rolling steps tend to align the outermost carbon fibers mostly, so that the direction of the carbon fibers from previous calendering steps is maintained inside the bulk of the sheet. Accordingly, when a precursor slab after calendering in one direction is calender rolled in a different direction, for example transverse direction, an increase of strength is observed also in this calendering direction.

For example, an endless sheet is first calendered into a direction parallel with the endless sheet and then cut into a slab and then calendered further in a different direction, for example transverse direction.

The subsequent hot-compression molding transforms the slab into an electrically conductive, rigid separator plate for a fuel cell, for example a BPP.

The production with the stacking results in a self-organized laminate structure of the multilayer slab, which makes the precursor particularly suitable for hot compression molding of the precursor into ultra-thin separator bipolar plates. It has been experimentally verified that the resulting multilayer bipolar plates have superior mechanical and electrical characteristics.

For example, the separator plate has an area specific resistance of at most 2 mΩ·cm² per thickness unit of 0.3 mm.

Optionally, the separator plate has a flexural strength of more than 180 MPa per thickness unit of 0.3 mm.

The hot compression molding modifies the shape of the separator plate, for example with a flow field structure for flow of fluid impressed into the material on at least one side of the separator plate, although typically on both sides, especially if the separator plate is a BPP.

Such separator plate, for example BPP, is useful for high temperature polymer electrolyte membrane fuel cell, (HT-PEM), which operates above 120 degrees centigrade, differentiating HT-PEM fuel cell from low temperature PEM fuel cells, the latter operating at temperatures below 100 degrees, for example at 70 degrees. The normal operating temperature of HT-PEM fuel cells is the range of 120 to 200 degrees centigrade, for example in the range of 160 to 170 degrees centigrade. Such HT-PEM fuel cells are advantageous for compact fuel cell systems, for example for automobile industry.

Aspects

In the following, various interrelated aspects are described which also fulfil the objective.

Aspect 1. A moldable, malleable, precursor sheet for hot-compression molding into an electrically conductive, rigid separator plate for a fuel cell, wherein the precursor sheet is formed as a multilayer structure with a plurality of layers in stacked condition or as a single layer, wherein the single layer or each layer in the plurality of layers of the multilayer structure has a thickness X and is provided as a polymer matrix that comprises a thermoplastic polymer blend in which carbon fibers and electroconductive carbon particles are dispersed; wherein the thermoplastic polymer blend comprises PTFE and a thermoplastic polymer different from PTFE, for example PPS; wherein the carbon fibers have an average length L that is larger than the thickness X1 of the layer.

Aspect 2. Precursor sheet according to aspect 1, wherein the carbon fibers have an average length L that is at least twice as large as the thickness X1 of the layer Aspect 3. Precursor sheet according to any preceding aspect, wherein the thickness X1 is in the range of 0.05-1 mm.

Aspect 4. Precursor sheet according to any preceding aspect, wherein the weight concentration of the carbon fibers is in the range of 5-20 wt. % relative to the total weight of the polymer blend, carbon fibers, and electroconductive carbon particles.

Aspect 5. Precursor sheet according to any one of the preceding aspects, wherein the weight concentration of PTFE is at least 0.05 wt. % but less than 0.5 wt. % PTFE and wherein the weight concentration of the thermoplastic polymer different from PTFE, For ex-ample PPS, is 5-30 wt. %, relatively to the total weight of the polymer blend, carbon fibers and electroconductive carbon particles.

Aspect 6. Precursor sheet according to any one of the preceding aspects, wherein the electro-conductive carbon particles in the thermoplastic polymer blend comprises at least a first and a second portion, wherein the carbon particles of the first portion are graphite particles with an average size in the range of 10-100 μm, and wherein the carbon particles of the second portion have a size in the range of 0.1-10 μm, wherein the weight concentration of the first portion is in the range of 50-90 wt. % relatively to the total weight of the polymer blend, carbon fibers and electroconductive carbon particles, and wherein the weight ratio between the first and the second portion of electroconductive carbon particles is in the range of 5-20.

Aspect 7. Precursor sheet according to any one of the preceding aspects, wherein the thermo-plastic polymer is PPS.

Aspect 8. Precursor sheet according to any one of the preceding aspects, wherein the sheet is a multi-layer structure, and the plurality of layers are identical.

Aspect 9. Precursor sheet according to any one of the preceding aspects, wherein the sheet is a multi-layer structure and each of the plurality of layers has a thickness X1 in the range of 0.05-0.3 mm, wherein the number of the plurality of layers is in the range of 2-10, for example 4-8.

Aspect 10. Precursor composition according to any preceding aspect, wherein the carbon fibers have an average length in the range of 0.1-1 mm.

Aspect 11. A method of production of a precursor sheet according to any preceding aspect, the method comprising:
providing an aqueous dispersion, the aqueous dispersion comprising PTFE particles, carbon fibers, and a first portion of graphite particles; wherein the graphite particles of the first portion have an average particle size in the range of 0.1-10 μm; wherein the carbon fibers have an average length L;
providing a solvent dispersion, the solvent dispersion comprising carbon black particles and particles of a second thermoplastic polymer that is different from PTFE, for example PPS, dispersed in an organic solvent;
stirring both dispersions for preventing sedimentation of the particles;
combining and mixing the two dispersions;
mixing a second portion of graphite particles with the two dispersions, the graphite particles of the second portion having an average size in the range of 10-100 μm; wherein the second portion has a weight which is 5-20 times larger than the sum of the weight of the first portion and the weight of the carbon black;
kneading the mix in a kneader;
during kneading in the kneader, raising the temperature to elevated temperature levels sufficiently high for evaporating the organic solvent and water from the mix, wherein the elevated temperature levels are above the glass transition temperature of PTFE,
after evaporation of the organic solvent and water and while the second thermo-plastic polymer is in a molten state, forming the mix into a sheet in a forming station.

Aspect 12. Method according to aspect 11, wherein the method comprises forming the sheet in the forming station to a thickness X1 smaller than the average length L of the carbon fibers.

Aspect 13. Method according to aspect 12, further comprising preparing the precursor sheet ready for hot compression molding, the preparation comprising cutting the molten sheet into slabs and stacking multiple of such slabs of thickness X1 one on top of the other in molten state for providing a multi-layer precursor for compression molding into a separator plate.

Aspect 14. Method according to aspect 12 or 13, wherein the forming station is a calender rolling station and the forming comprises press-rolling the sheet by the calender rolling station; wherein the method further comprises cooling the sheet after the press-rolling for solidifying the sheet and providing the sheet as a quasi-endless slab with a sheet thickness X1 and rolling the quasi-endless slab after the cooling onto a roll for storage as a rolled quasi-endless slab in solidified state and for later cutting and hot-compression molding.

Aspect 15. Method according to any one of the aspects 11-14, wherein the elevated temperature levels during the kneading in the kneader are below the melting temperatures of the PTFE and the second thermoplastic polymer; wherein the method comprises extracting the mix from the kneader, and then raising the temperature of the mix to a level sufficiently high to melt the second thermoplastic polymer before forming the sheet into a slab with thickness X1 in the forming station.

16. Method according to aspect 15, wherein the providing of the aqueous dispersion comprises adding a surfactant to the aqueous dispersion, wherein the surfactant has a boiling temperature above the boiling temperature of water and above the boiling temperature of the organic solvent; wherein the method comprises extracting the mix from the kneader while the mix contains the surfactant but neither the solvent nor water, and then raising the temperature of the mix to a level sufficiently high to evaporate the surfactant prior to forming the sheet into a slab with thickness X1 in the forming station.

Aspect 17. Method according to any one of the aspects 11-16, wherein the weight con-centration of PTFE in the mix is at least 0.05 wt. % but less than 0.5 wt. % PTFE and the weight concentration of the thermoplastic polymer different from PTFE is in the range of 5-30 wt. %, the weight percentages being relatively to the total weight of the carbon fibers and carbon particles, the PTFE, and the thermoplastic polymer.

Aspect 18. A rigid, press-molded separator plate for a fuel cell, wherein the separator plate
is formed as a multilayer structure with a plurality of layers in stacked condition or as a single layer, wherein the single layer or each layer in the plurality of layers of the multilayer structure has a thickness X2 and is provided as a polymer matrix that comprises a thermoplastic polymer blend in which carbon fibers and electroconductive carbon particles are dispersed; wherein the thermoplastic polymer blend comprises PTFE and a thermoplastic polymer different from PTFE, for example PPS; wherein the carbon fibers have an average length L that is larger than the thickness X2 of the layer.

Aspect 19. Separator plate according to aspect 18, wherein the carbon fibers have an average length L that is at least twice as large as the thickness X2 of the layer Aspect 20. Separator plate according to aspect 19, wherein the separator is provided as a multilayer structure comprising a plurality of layers in stacked condition, wherein each layer of the plurality of layers has a thickness X2 in the range of 0.05-0.2 mm.

Aspect 21. Separator plate according to aspect 20, wherein the separator plate has an area specific resistance of at most 2 mΩ·cm2 per thickness unit of 0.3 mm.

Aspect 22. Separator plate according to aspect 20 or 21, wherein the separator plate has a flexural strength of more than 180 MPa per thickness unit of 0.3 mm.

Aspect 23. Separator plate according to anyone of the aspects 18-22, wherein the separator plate has a flow field structure for flow of fluid impressed into the material of at least one side of the separator plate.

Aspect 24. Separator plate according to aspect 23, wherein the separator plate is a bipolar plate with a fluid flow structure on both sides of the bipolar plate.

Aspect 25. A fuel cell with a separator plate according to any one of the aspects 18-24 or with a separator plate provided as a hot-press-molded plate from a precursor sheet according to anyone of the aspects 1-10.

Aspect 26. A moldable, malleable, precursor sheet for hot-compression molding into an electrically conductive, rigid separator plate for a fuel cell, wherein the precursor sheet is formed as a single layer, wherein the single layer has a thickness X1 in the range of 0.05-1 mm and is provided as a polymer matrix that comprises a thermoplastic polymer blend in which carbon fibers and electroconductive carbon particles are dispersed; wherein the thermoplastic polymer blend comprises polytetrafluoroethylene, PTFE, and a thermoplastic polymer different from PTFE, for example PPS; wherein the carbon fibers have an average length L in the range of 0.1-1 mm.

Aspect 27. Precursor sheet according to Aspect 26, wherein optionally the carbon fibers have an average length L that is at least twice as large as the thickness X1 of the layer Aspect 28. Precursor sheet according to Aspect 26 or 27, wherein the thermoplastic polymer different from PTFE 15 polyphenylene sulfide, PPS.

Aspect 29. Precursor sheet according to any one of the Aspects 26-28, wherein the weight concentration of the carbon fibers is in the range of 5-20 wt. % relative to the total weight of the polymer blend, carbon fibers, and electroconductive carbon particles.

Aspect 30. Precursor sheet according to any one of the Aspects 26-29, wherein the weight concentration of PTFE is at least 0.05 wt. % but less than 0.5 wt. % PTFE and wherein the weight concentration of the thermoplastic polymer different from PTFE, for example PPS, is 5-30 wt. %, relatively to the total weight of the polymer blend, carbon fibers and electroconductive carbon particles.

Aspect 31. Precursor sheet according to any one of the Aspects 26-30, wherein the electroconductive carbon particles in the thermoplastic polymer blend comprises at least a first and a second portion, wherein the carbon particles of the first portion are graphite particles with an average size in the range of 10-100 μm, and wherein the carbon particles of the second portion have a size in the range of 0.1-10 μm, wherein the weight concentration of the first portion is in the range of 50-90 wt. % relatively to the total weight of the polymer blend, carbon fibers and electroconductive carbon particles, and wherein the weight ratio between the first and the second portion of electroconductive carbon particles is in the range of 5-20.

Aspect 32. Method of producing a separator plate by
mixing thermoplastic polymer, carbon fibers, and electroconductive carbon particles in a dispersion, wherein the carbon fibers have an average length of L in the range of 0.1-1 mm;
forming a moldable malleable single layer precursor sheet of thickness X1 from the mix by calender rolling in a forming station;
hot-compression molding the precursor into a single layer separator plate into a thickness of X2 in the range of 0.05-0.6, for example 0.05-0.3 mm, wherein X2 is less than the average length L of the carbon fibers.

Aspect 33. Method according to Aspect 32, wherein the method comprises providing the carbon fibers with an average length L that is at least twice as large as the thickness X2 of the layer.

Aspect 34. Method according to Aspect 32 or 33, wherein the thermoplastic polymer is a blend that comprises PTFE and a thermoplastic polymer different from PTFE Aspect 35. Method according to Aspect 34, wherein thermoplastic polymer different from PTFE 15 polyphenylene sulfide, PPS.

Aspect 36. Method according to anyone of the Aspects 32-35, the method comprising:
  providing an aqueous dispersion, the aqueous dispersion comprising PTFE particles, carbon fibers; wherein the carbon fibers have an average length L;
  providing a solvent dispersion, the solvent dispersion comprising carbon black particles and particles of a second thermoplastic polymer that is different from PTFE, for example PPS, dispersed in an organic solvent;
  stirring both dispersions for preventing sedimentation of the particles;
  combining and mixing the two dispersions;
  mixing a portion of graphite particles with the two dispersions, the graphite particles of the portion having an average size in the range of 10-100 µm; wherein the portion has a weight which is 5-20 times larger than the weight of the carbon black;
  kneading the mix in a kneader;
  during kneading in the kneader, raising the temperature to elevated temperature levels sufficiently high for evaporating the organic solvent and water from the mix, wherein the elevated temperature levels are above the glass transition temperature of PTFE,
  after evaporation of the organic solvent and water and while the second thermoplastic polymer is in a molten state, forming the mix into a precursor sheet in the forming station.

Aspect 37. Method according to Aspect 36, wherein the portion of graphite particles is a second portion of graphite particles, and wherein the method comprises providing the aqueous dispersion containing a first portion of graphite particles in addition to the PTFE and carbon fibers; wherein the graphite particles of the first portion have an average particle size in the range of 0.1-10 µm.

Aspect 38. Method according to anyone of the Aspects 32-37, wherein the elevated temperature levels during the kneading in the kneader are below the melting temperatures of the PTFE and the second thermoplastic polymer; wherein the method comprises extracting the mix from the kneader, and then raising the temperature of the mix to a level sufficiently high to melt the second thermoplastic polymer before forming the sheet into a precursor sheet with thickness X1 in the forming station.

Aspect 39. Method according to Aspect 38, wherein the providing of the aqueous dispersion comprises adding a surfactant to the aqueous dispersion, wherein the surfactant has a boiling temperature above the boiling temperature of water and above the boiling temperature of the organic solvent; wherein the method comprises extracting the mix from the kneader while the mix contains the surfactant but neither the solvent nor water, and then raising the temperature of the mix to a level sufficiently high to evaporate the surfactant prior to forming the sheet into a slab with thickness X1 in the forming station.

Aspect 40. Method according to anyone of the Aspects 32-39, wherein the weight concentration of PTFE in the mix is at least 0.05 wt. % but less than 0.5 wt. % PTFE and the weight concentration of the thermoplastic polymer different from PTFE is in the range of 5-30 wt. %, wherein the weight concentration of the carbon fibers is 2-20 wt. %, the weight percentages being relatively to the total weight of the carbon fibers and carbon particles, the PTFE, and the thermoplastic polymer.

Aspect 41. Method according to anyone of the Aspects 32-40, wherein the method comprises calender rolling the precursor sheet in at least two different directions for aligning the carbon fibers in different directions.

Aspect 42. A rigid, rolled and press-molded separator plate for a fuel cell, wherein the separator plate is formed as a single layer from a single layer precursor sheet, wherein the single layer has a thickness X2 in the range of 0.05-0.6, for example 0.05-0.3 mm, and is provided as a polymer matrix that comprises a thermoplastic polymer blend in which carbon fibers and electroconductive carbon particles are dispersed; wherein the thermoplastic polymer blend comprises PTFE and a thermoplastic polymer different from PTFE, for example PPS; wherein the carbon fibers have an average length L that is in the range of 0.1-1 mm and larger than the thickness X2 of the layer.

Aspect 43. Separator plate according to Aspect 42, wherein the carbon fibers have an average length L that is at least twice as large as the thickness X2 of the layer.

Aspect 44. Separator plate according to Aspect 42 or 43, wherein the weight concentration of the carbon fibers is in the range of 5-20 wt. % relative to the total weight of the polymer blend, carbon fibers, and electroconductive carbon particles, wherein the weight concentration of PTFE is at least 0.05 wt. % but less than 0.5 wt. % PTFE and wherein the weight concentration of the thermoplastic polymer different from PTFE, for example PPS, is 5-30 wt. %, relatively to the total weight of the polymer blend, carbon fibers and electroconductive carbon particles.

Aspect 45. Separator plate according to Aspect 42, 43, or 44, wherein the electroconductive carbon particles in the thermoplastic polymer blend comprises at least a first and a second portion, wherein the carbon particles of the first portion are graphite particles with an average size in the range of 10-100 µm, and wherein the carbon particles of the second portion have a size in the range of 0.1-10 µm, wherein the weight concentration of the first portion is in the range of 50-90 wt. % relatively to the total weight of the polymer blend, carbon fibers and electroconductive carbon particles, and wherein the weight ratio between the first and the second portion of electroconductive carbon particles is in the range of 5-20.

SHORT DESCRIPTION OF THE DRAWINGS

The invention is explained in more detail with reference to the drawings, wherein.

DETAILED DESCRIPTION/PREFERRED EMBODIMENT

In the production method described herein, a few partial processes are combined, namely compounding of raw powdered materials, followed by their kneading and calendering into preformed shapes, such as thin slabs with specified density, and further compression molding such slabs to provide separator plates for fuel cells, optionally electrode plates, end plates, or BPPs. In the following, the method will be explained for BPPs, however, the method applies equally well for such variety of plates in a fuel cell or a fuel cell stack. Thus, all partial method processes as described in the following should also be read on such other type of separator plates, although, the highest advantage is believed to be achieved by this method for BPPs.

Figure 1:
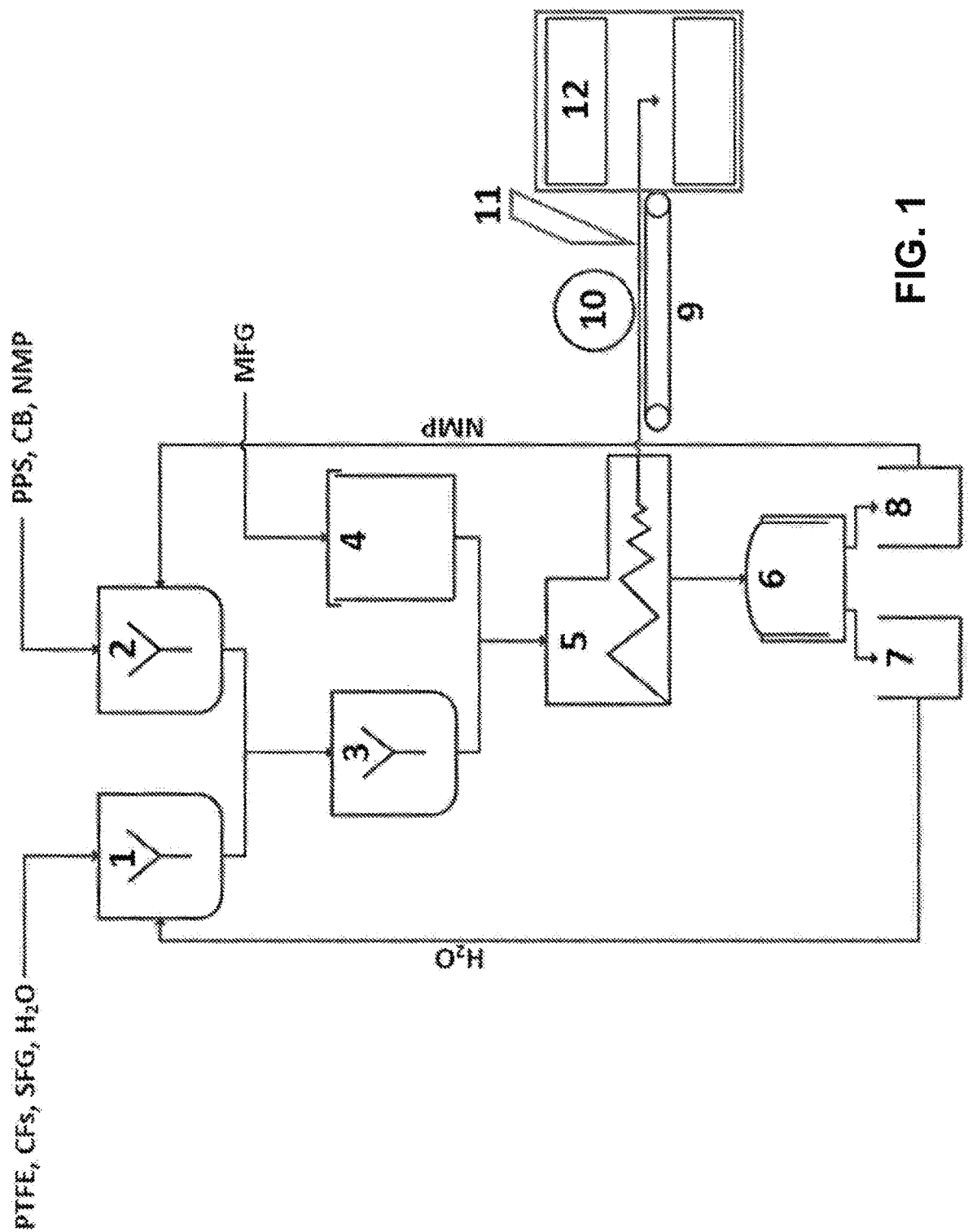
FIG. 1 is a scheme of a continuous process for making a graphite-based compound, preforming the compound into slabs, and molding bipolar plates from it.

In FIG. 1 shows a scheme that illustrates the fabrication for producing BPPs based on graphite, carbon fibers (CFs), and carbon black (CB) and its binding in a polymer matrix with the polymers PPS and PTFE.

It should be mentioned here that other thermoplastic polymers can be also be utilized in the fabrication of BPPs for high-temperature PEM fuel cells. Candidates are, among others, ethylene tetrafluoroethylene (ETFE), fluorinated ethylene propylene (FEP), perfluoroalkoxy alkane (PFA), polyamideimide (PAI), polychlorotrifluoroethylene (PCTFE), polyether ether ketone (PEEK), polyetherketone (PEK), polyetherimide (PEI), polyethersulfone (PES), polyphenylsulfone (PPSU), polysulfone (PSU), polyvinylidene fluoride (PVDF), see also [Ref. 25].

PTFE is provided in an aqueous dispersion, for example with a relative concentration in the range of 10-80 wt. %, optionally in the range of 50-70 wt. % PTFE in water, for instance a 60 wt. % aqueous dispersion. Such latter dispersion is commercially available, for example from the company Merck®. The dispersion, as purchased, may optionally be further diluted to a suitable concentration by mixing with deionized water. In addition, surfactants may be added.

As illustrated in FIG. 1, PTFE, CFs and graphite as well as other potential ingredients, such as surfactants, are provided in a first container 1. The content of surfactants does not exceed 10 vol. % in the total liquid composition, but typically it is within range from 0.2 to 2 vol. %. It should be noted here that the PTFE dispersion from the supplier, typically, already contains a small amount of surfactants to avoid agglomeration of the polymer particles [Ref 26].

Non limiting example of surfactants are Tergitol™ 15-S Series from Dow Chemicals®, Triton® X Series from Union Carbide Corporation® or Tween® Series from Croda International®. For example, TritonX-100™ from the Triton X Series has a hydrophilic polyethylene oxide chain and an aromatic hydrocarbon lipophilic or hydrophobic group. The hydrocarbon group is a 4-phenyl group. The formula is $C_{14}H_{22}O(C_2H_4O)_n$, where n is 9-10.

For example, useful mass ratios between solid and liquid phases in the first container 1 are in the range of 1:4 to 1:6, such as about 1:5. On the one hand, a low volume of water is desired in the process in order to minimize energy and resource consumption in the process, on the other hand, the process needs a sufficient amount of liquid for maintaining a proper dispersion.

Optionally, CFs are provided with average lengths in the range 0.1-1 mm, for example lengths in the range of 0.2-0.4 mm, such as approximately 0.3 mm in length. The lengths given here are average lengths. For example, the statistical distribution related to the averaged lengths have a FWHM less than or in the order of ±20%. As will become more apparent in the following, the average length of the CFs are selected in relation to the layer thickness X1.

Advantageously, a small fraction of graphite (SFG) is added. The term "small fraction" refers to a relatively percentage range of 2-10 wt. % relatively to the total dry weight of the final product, i.e. without liquid. Optionally, the SFG graphite particles are provided with average particle sizes in the range 0.1-10 μm, for example in the range of 0.5-2 μm. In experiments, the average size of the graphite particles of the SFG was 1 μm.

As already mentioned, the sizes given herein for polymer particles and carbon particles, including graphite and carbon black, are average sizes, which means averaged over the three dimensions of the particles as well as over the number of particles of this specific group or type. Typically, for the particles, the statistical distribution related to the dimensionally-averaged sizes have a FWHM lower than or in the order of ±20%.

In this first container 1, all ingredients are intensively stirred.

Examples of weight ratios between PTFE, CF, and graphite (SFG) are in the ranges of (0.05-0.5):(0.05-15):(0.05-15). In experiments, the ratios were 0.25:10:5.

In parallel, a second powder mixture is provided in a second container 2. This second powder mix contains PPS powder, optionally having average particle sizes in the range of 10-100 μm, for example in the range of 20-30 μm, such as approximately 25 μm.

Further, in this second container 2, CB particles are provided, optionally having average sizes in the range of 10-100 nm, for example in the range of 30-50 nm, such as approximately 40 nm.

The particles in the second container 2 are mixed with N-methyl-2-pyrrolidone (NMP) in order to provide a viscous slurry. NMP is provided in container 2 to achieve wetting of the hydrophobic PPS and CB particles before dispersing them in the aqueous media from the first container 1, as NMP has excellent wetting characteristics due to the polar nature and low surface tension [Ref. 27]. It is pointed out that NMP can dissolve ca. 10 wt. % of PPS at 203° C. [Ref 28]. At lower temperatures, NMP probably dissolves only very thin near-surface layers of the polymer particles [Ref 29]. Being miscible with water at all temperatures [Ref 30], NMP plays role of a "bridge" for water molecules, delivering them directly to the surface of the hydrophobic particles.

Some other solvents can be used as alternative to NMP for this purpose, for example N,N-dimethyl acetamide, N,N-dimethylformamide, and dimethyl sulfoxide. The use of these solvents in combination with surfactants allows production of long-time stable dispersions of PPS, but the process occurs at temperatures in the range of 220-320° C. [Ref 31], which is not optimum.

The distribution of one portion of carbon particles into the first container 1 and another portion of carbon particles into the second container 2 is based on the consideration that the overall amount of liquid should be minimized in order to avoid unnecessary consumption of energy for subsequent evaporation of the liquids. In principle, all particles could be added to the second container 2 with the NMP, but in that case the solid content in container 2 would require unnecessarily high amount of NMP in order for the particle concentration be at an acceptable level for an efficient mixing. Furthermore, the production method takes into consideration the minimizing of the amounts of organic solvents that are used, which adds to the method being environmentally friendly, especially when the solvent is recycled. The selection of dispersing the CB and PPS into the second container 2 is due to the fact that these carbon particles are more difficult to be wetted by water than by NMP. On the other hand, SFG and CFs are not so hydrophobic, why these are more suitable to be added to the aqueous dispersion in the first container 1.

In our case, sedimentation and agglomeration of fine PPS particles in the second container 2 is avoided due to the continuous stirring of the dispersion until the main filler, i.e. graphite, is added. After this addition of the graphite at substantial concentration, the viscosity of the system increases so much that sedimentation becomes almost impossible, even if stirring is stopped for a long time. As stirring is no longer feasible, a kneader is used for the next stages, as described in more detail in the following.

After separate preparation of these two dispersions in the first container 1 and the second container 2, they are mixed, for example in a third container 3, as illustrated in FIG. 1, for uniform distribution of polymer and carbon particles. Typically, the NMP content in the water after their mixing in the third container 3 does not exceed 25 vol. % relatively to the entire mixture volume in container 3. For example, in the third container 3, the concentration of NMP in the mixture is in the range of 10-25 vol. %.

When this mixing process step is completed, the SFG/CFs/CB/PPS/PTFE suspension is transferred from the third container 3 to a kneader 5, together with an amount of graphite from a fourth container 4. As the amount of graphite from the fourth container 4 is relatively large and leads to a relatively large fraction in the final mix, it is termed "main fraction of graphite" (MFG). The ratio between MFG: SFG is at least 2, for example at least 3, but typically at least 5, and typically at most 20, for example in the range of 5-20. In experiments, a ratio MFG: SFG of 13 has been used.

For example, the relative content of the MFG in weight percentages relatively to the dry mass of the mix in kneader 5 is in the range of 40-80 wt. %. In experiments, the concentration of MFG was 66.25 wt. % of the dry mass.

Optionally, this graphite for the MFG has an average particle size in the range of 10-100 μm, for example in the range of 10-30 μm. In experiments, the average size of the graphite particles of the MFG was 20 μm. Notice that the particle size in MFG is an order of magnitude larger than in SFG.

Figure 5A:
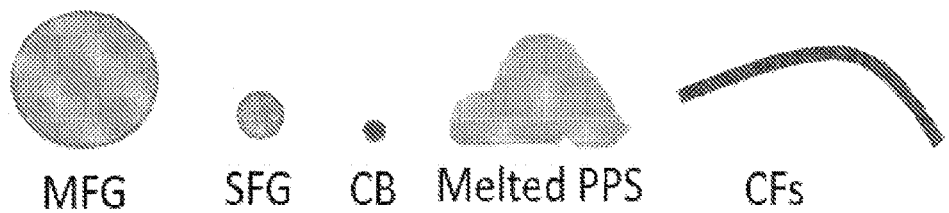
FIG. 5 is a simplified illustration for flow of electrical current through a composite with electroconductive carbon particles of different sizes with a) only one size of particles, and b) different sized of particles.
Figure 5A:
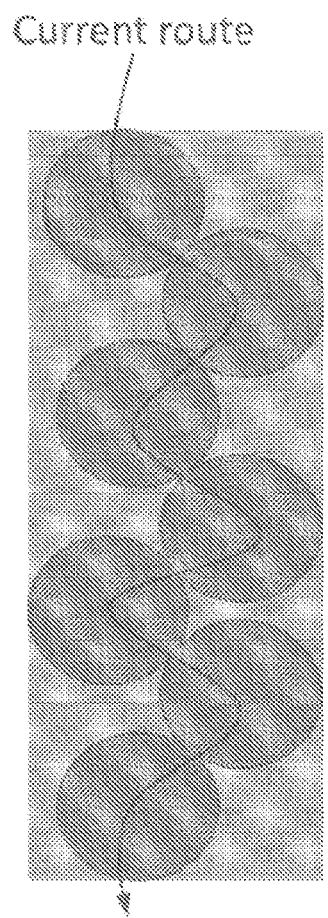
Figure 5B:
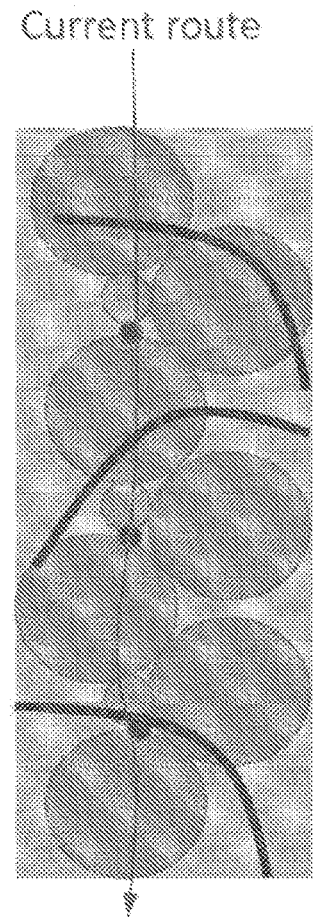

The MFG is the main carbon component in the composite. FIG. 5 illustrates in simplified manner the advantage of different particle sizes. In FIG. 5*a*, only one size of carbon particles is provided, whereas in FIG. 5*b*, it is clearly seen that the smaller particles act as electro-conductive bridges between the larger particles, which reduces the overall resistivity of the final composite. When constructing such composite matrix, also considerations apply with respect to realistic and competitive production costs for commercial products, which is why the amount of relatively expensive nano-sized graphite has to be balanced with the advantage it provides dependent on its concentration. The addition of CB is based on a compromise to obtain a high electrical conductivity and competitive production costs.

By the addition of the MFG, the solid content in the mixture inside the kneader 5 is increased, reaching a solid content in the range of 30-70 wt. %, for example in the range of 40-60 wt. %, such as approximately 50 wt. %. Mixing procedures in the containers 1, 2, 3, and 4 are carried out at a first temperature level T1, typically at room temperature, e.g. at in the range of 20-25° C., which is enough for uniform distribution of the powdered materials.

This is an advantage as compared to processes described in [Ref. 32], where polymers used for binding carbon particles must be completely dissolved in an appropriate solvent, which is not so easy for high engineering plastics like PPS because temperatures above 200° C. are required. And even worse, in order to obtain more than 50 wt. % solubility of PPS, the temperature would have to be higher than 300° C. [Ref 28]. Also, the solvents that are suitable for this, typically, have high boiling point, making it problematic to further remove it from the compound before its molding.

The kneading of the MFG/SFG/CFs/CB/PPS/PTFE mixture in the kneader 5 starts at the first temperature level T1, for example at room temperature, and continues during heating of the mix to elevated temperatures at or above the boiling points of the used liquids in order to remove the liquids from the mix by evaporation. The kneading during evaporation prevents bubble formation or at least minimizes the risk for bubble formation.

The kneading process takes typically 10-30 min, however, depending on the speed of the temperature increase and the evaporation of the liquids.

From the first temperature level T1, for example in the range of 20-25° C., the mixture is heated to increase the temperature gradually from the first temperature level T1 to a second temperature level T2, where T2 is at the boiling point of water in order to remove water by evaporation.

In order to make sure that the kneading step is continued without bubble formation due to residue water in the mix, the mixture is heated to a third temperature level T3, well above the boiling point of water. For example, the third temperature level T3 is in the range of 102-120° C.

In experiments, the kneading was continued at the third temperature level T3, which was at 116° C., which is well above the boiling point of water and therefore makes certain that all water is removed from the mixture.

It is brought forward that PTFE undergoes a phase change at the glass transition temperature, which in our case was determined to be at 116° C., where the polymer is in a rigid amorphous state [Ref. 33] and the tendency for its fibridization from nanoparticles increases. Because of this, the compound becomes softer and malleable for kneading, i.e. the fibridization is useful in that it ultimately leads to enhanced cohesion between the components in the mixture.

After having removed water by evaporation, the temperature is increased further to a fourth temperature level T4 in order to remove the solvent by evaporation. In the experimental case described herein, where NMP was used as solvent, the fourth temperature T4 was adjusted to 204° C., at the boiling point of NMP [Ref. 30], in order to remove NMP by evaporation.

Optionally, for recycling purposes, all evaporated substances can be condensed to liquid phase again in a further container 6 and separated into pure solvents. Useful separation methods include distillation and/or membrane separation [Ref. 34, 35]. Water and NMP are collected in other containers 7 and 8, respectively, to be returned into the manufacturing process. It is pointed out that potential small rest amounts of surfactants dissolved therein does not interfere with this.

The soft compound is after kneading extracted from the kneader 5 as a dough-like malleable material. It is extruded onto a heated Conveyor 9.

In order to remove further liquids with higher boiling point from the kneaded MFG/SFG/CFs/CB/PPS/PTFE compound, for example non-ionic surfactants [Ref. 26], the temperature of the mix is raised even further to a fifth temperature level T5 that causes evaporation of the surfactants. For example, the fifth temperature level T5 is below the melting point of PPS, which is in the range of 271-292. In the experiment, the mix was heated up to a fifth temperature level T5 of 270° C., which removed the used surfactants but did not melt the PPS.

This temperature rise can be done while the mix is inside the kneader. However, for a smooth extrusion of compounds with relatively low content the polymer, it has been found advantageous if the compound still contains some non-evaporated surfactants. Accordingly, the temperature is increased to a level T5 for evaporation of the surfactant after extrusion from the kneader because, after extrusion, the surfactants are not needed anymore. For example, the boiling point of the surfactants Triton® X-100 is 270° C. [Ref 36]). This temperature increase can be done on the conveyor. The temperature of the mix, for example while in the conveyor, is increased even further up to sixth temperature level T6 above the melting level of the second thermoplastic polymer, which in the present experiment was a level of 347° C. in order to melt PPS and lower the viscosity, as it was done in the experiment. The final temperature, however, is depending on the molding parameters that are chosen.

Figure 6:
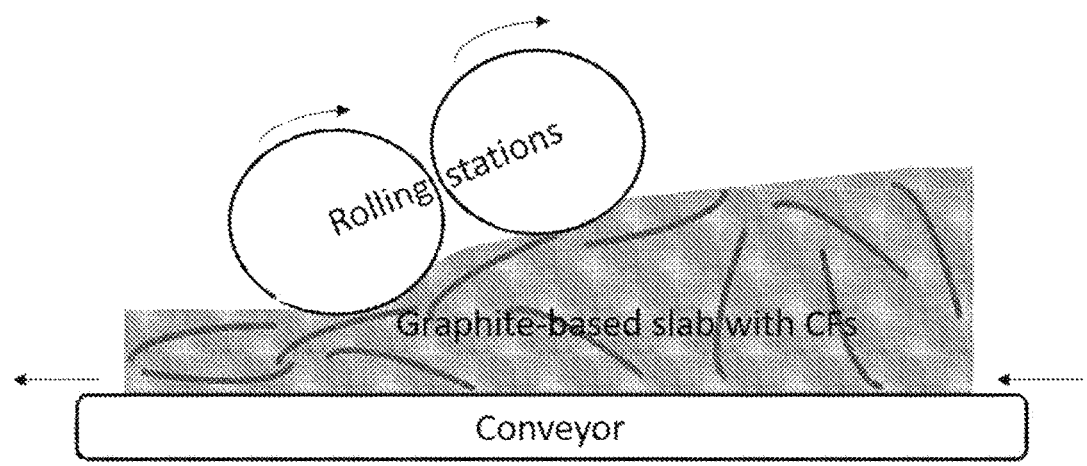
FIG. 6 illustrates sheet forming in a rolling station.

The Conveyor 9 forwards the dough-like structure through at least one rolling station 10 with a gap between calender rollers which is adjusted as needed in order to calender press the structure into a sheet with a specified thickness, normally in the range from 0.05 to 10 mm. The process is illustrated in greater detail in FIG. 6. However, as will be apparent from the discussion later, a thickness of less than 1 mm is advantageous for BPPs in order to save material and weight and for good performance. For example, the thickness is adjusted to a value in the range of 0.05-1 mm.

It should be noted, here, that producing films in the lower end of the thickness range, typically, requires more than one rolling station. After forming the film from the malleable structure, a cutting tool 11 cuts it into slabs.

In some performed experiments, thicknesses of 0.1 and 0.6 mm were used for comparison, where the slabs with 0.1 mm thickness were used for a stack in a precursor of 6 slabs, and the 0.6 mm slab was used for a single layer precursor and BPP. The resulting BPP after compression molding had a thickness of 0.3 mm, which is half of the precursor thickness, which is due to a decrease in thickness by the compression. In this connection, the following is pointed out. The slabs have a specified density, normally in the range of 0.5 to 1.5 g/cm$^3$, such as approximately 1 g/cm$^3$, as used in the experiments. However, the compression molded BPPs have a density slightly more than 2 g/cm$^3$. Accordingly, the precursor slabs should be provided thicker, in some cases up to ca. 2 times thicker. However, it is also pointed out that the formation of flow fields during the compression molding may compensate somewhat for the decrease in thickness.

Experimental dimensions of the slabs, apart from the thickness, are 400×100 mm, but by this method the slabs of any dimensions can be produced.

Finally, the pre-heated graphite-based slabs are formed into BPPs in a hot press machine 12 by means of compression molding. The compression molding is advantageously done at temperatures that are between the melting points of the multiple thermoplastic polymers used. For example, in case of PPS-PTFE, the molding temperature is advantageously in the range between the melting point of PPS (271-292° C.) and the melting point of PTFE (320-347° C.). Optionally, the temperature is in the range of 300-320° C.

Alternatively, the temperature is slightly higher than the melting point of PTFE. However, it should be below the decomposition temperature of PPS, which is around 475° C. [Ref. 37].

The temperature for the molding is generally depending on the molecular weights of the polymers and their melting temperatures as well as behavior during heat treatment [Ref. 38-40].

Such temperature range, where not all polymers are melted, helps avoiding the slabs sticking to the mold. Furthermore, PTFE can play the role as an anti-sticking component for the MFG/SFG/CFs/CB/PPS/PTFE compound.

During molding, the applied pressure is typically in the range of 25-225 MPa, for example in the range of 75-175 MPa. In the experiments, a pressure of 125 MPa was used.

The processing time is defined by the cooling speed of the BPP within the mold. Release of pressure occurs, when the temperature of mold is below the glass transition temperature of PPS, i.e. less than 93° C. [Ref. 38].

It should be mentioned here that the BPP can be fabricated either by utilization of a single slab, resulting in a single-layered BPP, or by using multiple slabs in stacked condition, for example 4-8 slabs on top of each other. In the experiment, 6 slabs were used to obtain a multi-layered slab and pressing it into a multi-layered BPP.

Each component in the compound, produced in such way, has a specific purpose. MFG is a main filler for PPS, whereas other additives improve both the mechanical properties, especially influenced by CFs, as well as electrical properties, especially influenced by SFG and CB, in addition to the ability of binding fine powdered materials in malleable dough-like structure, which is especially achieved by PTFE.

Percentage ratios between all these components in the final mixture can be varied within some constraints. For example, with all percentages being by weight:

The content of MFG is in the range of 25-90 wt. %, for example 50-90 wt. %. In the experiment slightly less than 70% was used.

The minimal amount of PPS is 5 wt. % and will typically be less than 30%. In the experiment, 20 wt. % is was used.

The total content of additives, SFG, CFs, CB, PTFE in the final compound is typically less than 45 wt. %.

The content of CF is in the range of 2-20 wt. %, however, advantageously in the range of 3-15 wt. %, such as 5-15 wt. %.

Examples of ranges for the components are 25-90 wt. % MFG, 5-30 wt. % PPS, 2-20 wt. % CF, 0.05-15 wt. % SFG, 0.05-10 wt. % CB, 0.05-5 wt. % PTFE, for example at least 0.05 wt. % but less than 0.5 wt. % PTFE.

All weight percentage are for given relatively to the polymer blend with the particles and fibers, thus, after removal of the liquids.

Experimentally, optimal electro-mechanical properties were demonstrated by the final compound without liquids containing the following quantities of individual components: MFG (66.25 wt. %), PPS (17.50 wt. %), CFs (10.00 wt. %), SFG (5.00 wt. %), CB (1.00 wt. %), PTFE (0.25 wt. %).

Dependences of flexural strength and areal specific resistance on the thickness for BPPs produced from compounds with such percent ratio between components are shown in FIG. 2.

Figure 2A:
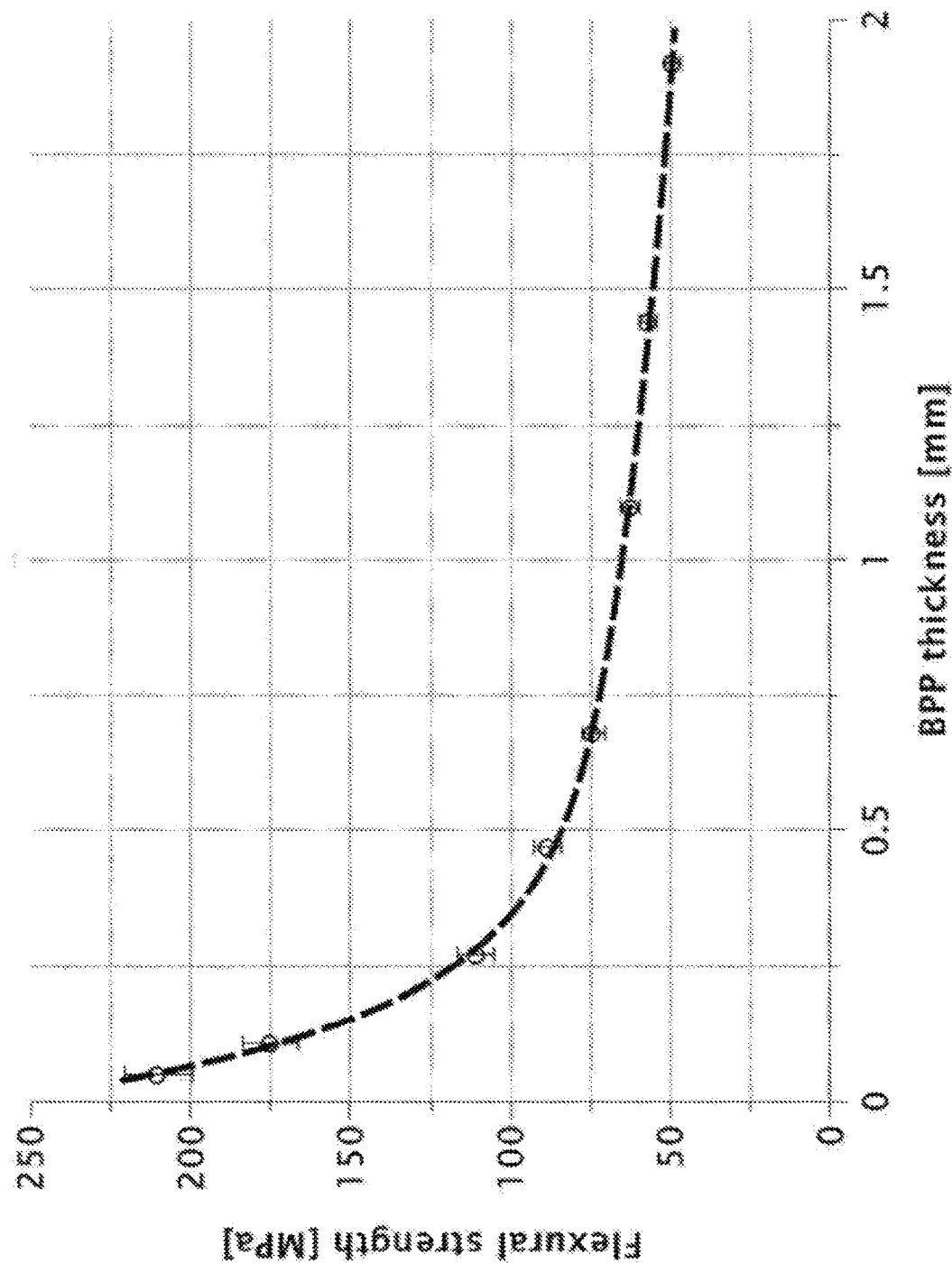
FIG. 2 illustrates (a) flexural strength and (b) areal specific resistance depending on the thickness for MFG/SFG/CF s/CB/PPS/PTFE-based BPPs.
Figure 2B:
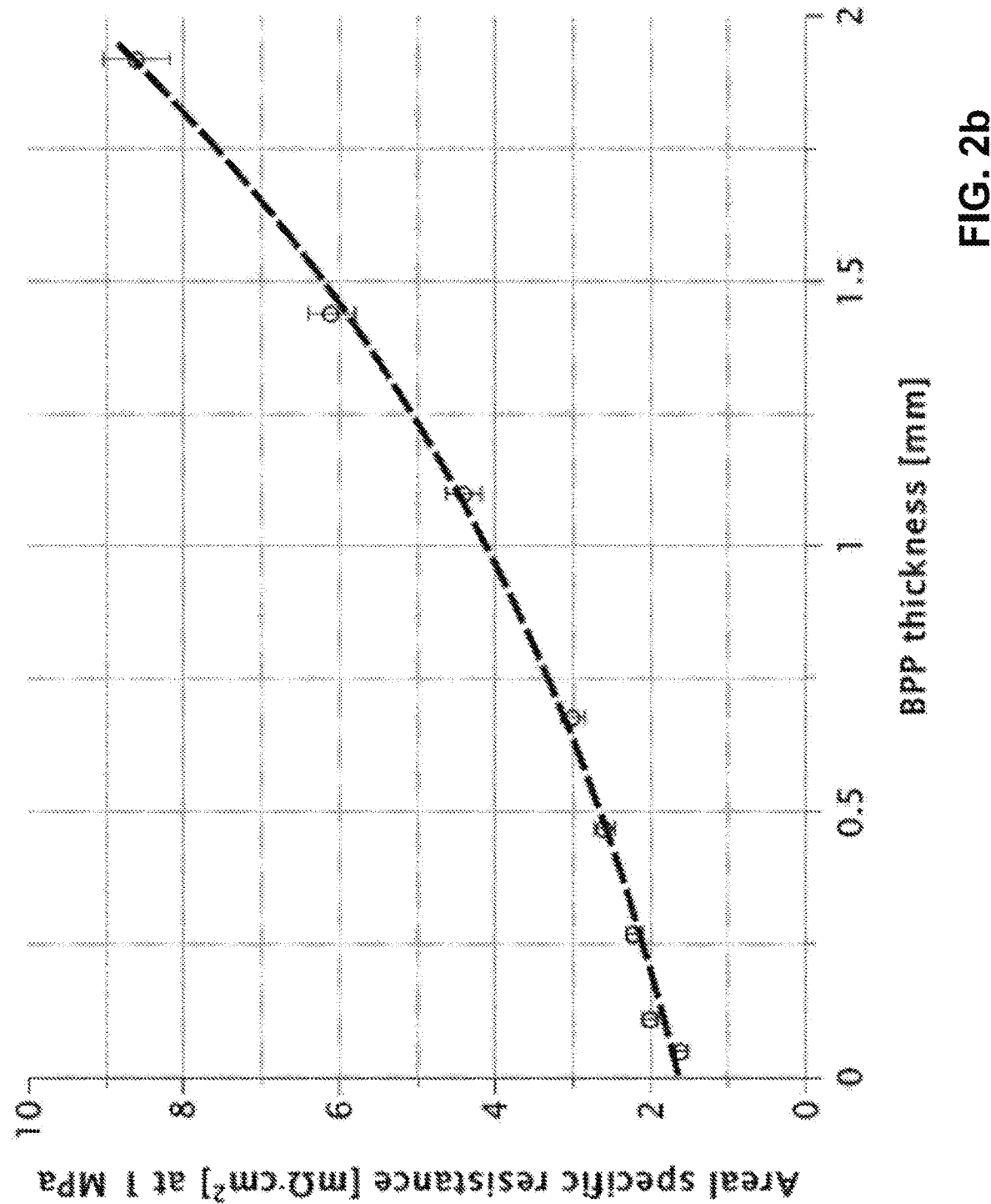
Figure 3:
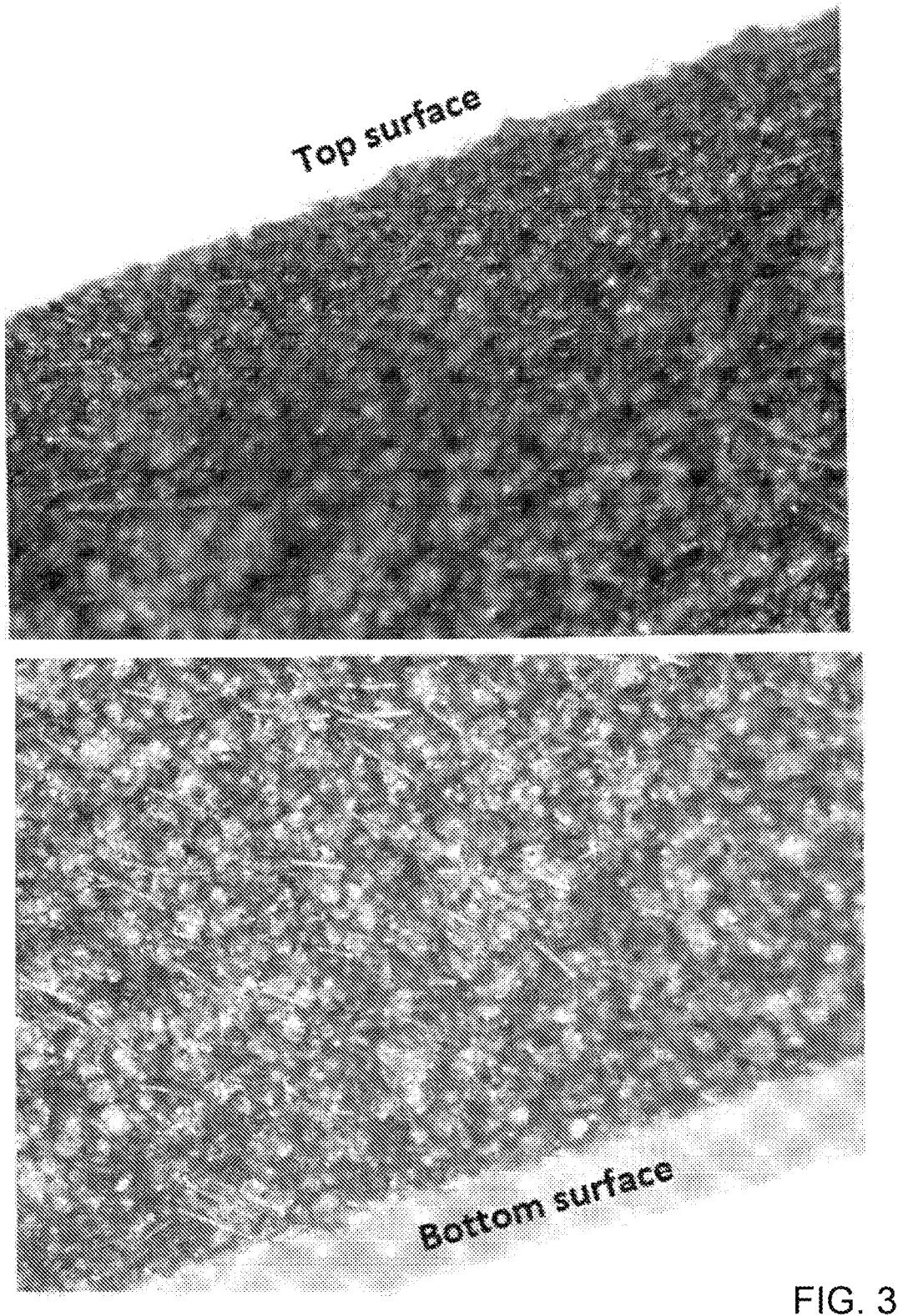
FIG. 3 shows microphotographs of a cross section of a slab.

As seen from the figure given above, these two dependences are not linear. Decrease of BPP thickness leads to a reduced areal specific resistance, as seen in FIG. 2b, and a significant growing of flexural strength, as seen in FIG. 2a. In particular, the flexural strength in dependence of thickness is growing for decreasing thickness and deviates from a quasi-linear shape for thicknesses below 1 mm, and in particular remarkable for thickness below 0.5 mm of the BPP. The growth of flexural strength for small thickness is believed to be due to a planar orientation of CFs in a near-surface layer. This near-surface layer is believed to be formed when the slabs are rolled and to have improved mechanical properties as compared to the remaining volume underneath the near-surface layer, where almost-perpendicular orientation of CFs is retained. This explanation implies that a self-organized laminate structure takes place, which was experimentally verified by microtomographic investigation, images of which are reproduced in FIG. 3 and which show existing of two main zones in the slab with different orientation of CFs therein. It is emphasized that this is an important finding, which can be utilized to great advantage as explained in the following.

For ultra-thin slabs and BPPs based thereon, there appears not enough space for perpendicular and mechanically weak orientation of CFs, why the CFs have to be at least partially oriented in parallel with the slab, which leads to a superior mechanical structure with the demonstrated exponential grow of flexural strength towards small thickness, as reflected in FIG. 2a. It should be noted here that the flexural strength of PPS is in the range of 125-135 MPa [Ref. 41], which is why such behavior appears to be related to anisotropic properties of the used carbon materials, mainly CFs. Something similar is shown in [Ref. 42] and there is also good correlation with mathematical models [Ref 43].

Figure 4:
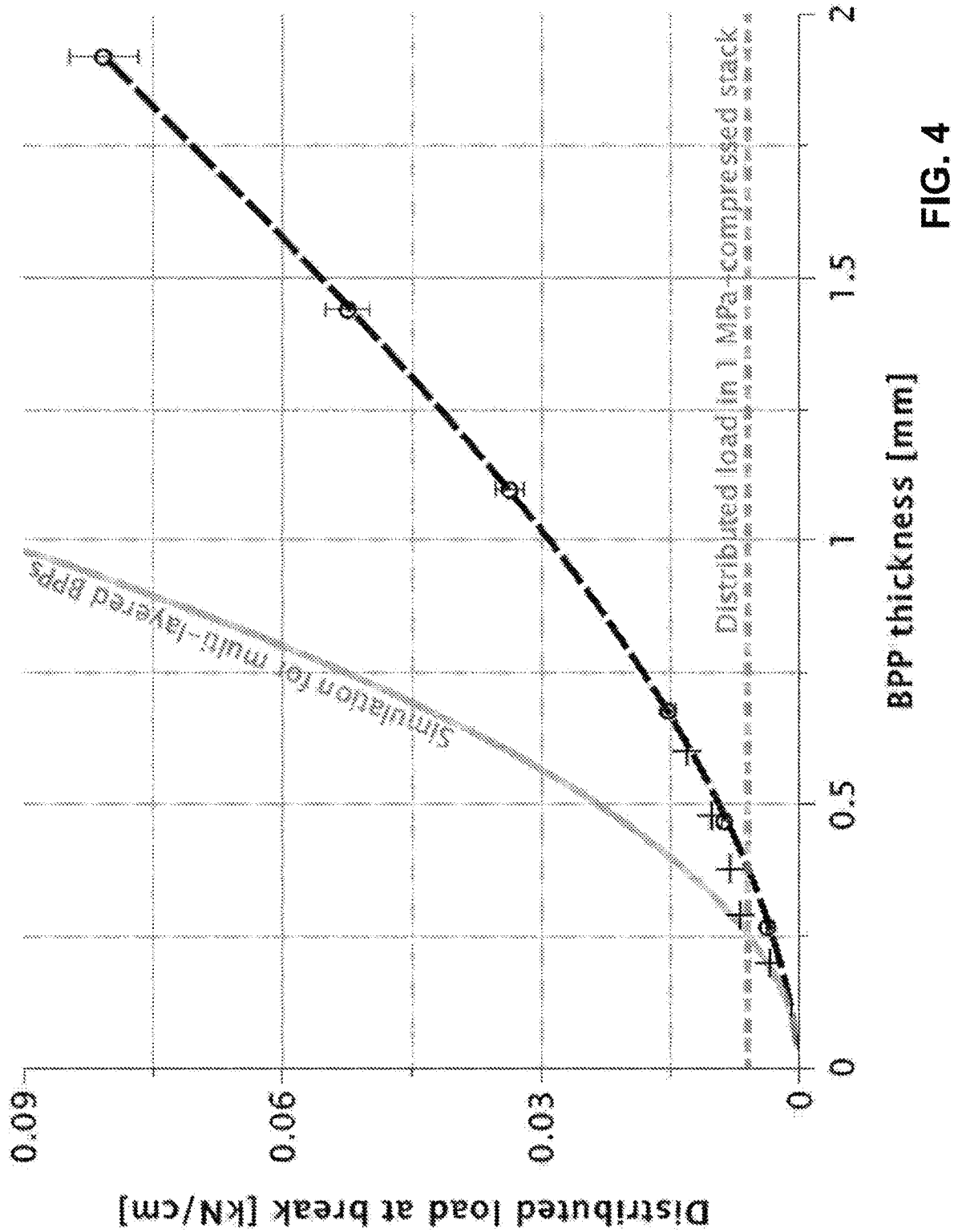
FIG. 4 illustrates the distributed load at break in dependence of the thickness of MFG/SFG/CFs/CB/PPS/PTFE-based BPPs (ellipse symbols refer to single-layered BPPs, cross symbols refer to multi-layered BPPs)

In order to define a practical minimal thickness of the BPP which is acceptable for use in PEM fuel cell stacks, a criterion is used that it needs to withstand a pressure 1 MPa, which is also recommended by one of the gas diffusion layer suppliers [Ref. 44]. Accordingly, strength should be considered in terms of distributed load as well, which is illustrated in FIG. 4 for various BPP thicknesses. FIG. 4 demonstrates that a minimal thickness for single-layer, i.e. 1 slab based, BPP is 0.38 mm in order to fulfill the 1 MPa criterion.

However, for multi-layered BPPs, the necessary minimum thickness for this criterion is remarkably lower, namely only 0.29 mm. This smaller necessary minimum thickness reflects the higher relative strengths of the thinner slabs used for fabrication of multilayer BPPs. This value of 0.29 mm for the necessary minimum thickness is in agreement with simulations as expressed by the left solid curve in FIG. 2. However, the curve appears only valid and reproducing the correct minimum thickness, as long as the thickness of the multi-slabs is small. For larger thicknesses, the theoretical simulation curve in FIG. 4 clearly shows a significant deviation from experimental data obtained for multi-layered BPPs. This can be explained by an effect of re-orientation of CFs from planar orientation back to the almost-perpendicular orientation during the molding process. This becomes possible, when the thickness of the BPPs exceeds the length of the CFs that are used in the material. This length was 300 µm in our experimental case. In other words, if the thickness of a layer is less than the average length of the embedded carbon fibers, an increase of strength is achieved.

It is pointed out, however, that the effect is especially pronounced in sub-millimeter thickness of layers, why multi-layers are advantages for thicker slabs and corresponding thicker separator plates, such as BPPs. When each layer in a multi-layer stack has been rolled as a separate slab prior to stacking the rolled layers into a multi-layer slab, the resulting increase of strength by the realignment of the CFs in the near surface layers is correspondingly multiplied.

It is noteworthy, that our experimental 6-layer BPP with a total thickness of 0.3 mm, produced by the method described herein, not only is the thinnest graphite-based BPP in the world at the time of writing the current patent application, but also by far the strongest.

Table 1 shows collected data on thickness, flexural strength, areal specific resistance and in-plane electrical conductivity for the 6-layered MFG/SFG/CFs/CB/PPS/PTFE-based BPP as produced experimentally by the method outlined herein (named "BWT" in the table), in comparison to BPPs fabricated from graphite-based compounds with PPS binder as obtained from commercial suppliers for testing, as well as BPPs for which corresponding test data were obtained from literature sources [Ref 15, 19, 45-48].

TABLE 1

Mechanical and electrical properties for a 6-layer BWT BPP, tested comparative ones and BPPs from literature sources

| Sample name | Thickness [mm] | Flexural strength [MPa] | Areal specific resistance [mΩ · cm$^2$] | In-plane electrical conductivity [S/cm] |
|---|---|---|---|---|
| BWT - 6 layers | 0.3 | 186* | 2** | 158*** |
| Comparative #1 | 1.5 | 40* | 7** | 125*** |
| Comparative #2 | 2.0 | 52* | 24** | 152*** |
| [Ref. 15] | 0.4 | N/A | N/A | 50 |
| [Ref. 19] | 3.0 | 60 | 25 | 209 |
| [Ref. 45] | 2.0 | 39 | N/A | 134 |
| [Ref. 46] | N/A | 65 | N/A | 78 |
| [Ref. 47] | N/A | 56 | N/A | 125 |
| [Ref. 48] | 5.0 | 52 | N/A | 119 |

*ASTM D790-17 Standard [Ref. 49]
**DOE's testing protocol [Ref. 50]
***Four-probe method [Ref. 51]

It is relevant to point out that there has been obtained better results than required by DOE's 2020 targets [Ref. 8] for ultra-thin BWT BPPs. In addition, numerous advantages have been obtained as compared to other graphite-based BPPs, namely higher strength and electrical conductivity, in addition to the BPPs providing higher levels of power density because of the volume of the entire stack is reduced.

It should be pointed out in comparison with the method in WO2018/072803 [Ref 53] that the carbon powder in this disclosure is mixed with polymer and then ground into a carbon-polymer powder. If carbon fibers would be part of such carbon mix, the grinding process would destroy much of the carbon fibers, so that the beneficial results as discussed above would not be obtained.

A highlight of the features achieved by this manufacturing process, are presented by the list given below.
1. An all-in-one production process, i.e. material compounding, slab rolling, and BPP molding occurs continuously in one manufacturing line with high degree of utilization for raw components, which is unlike the method applied in [Ref 22].

2. The use of a combination of different solvents, including water and an organic solvent, eases dispensing and compounding the various powdered materials even at room temperatures, which is advantageous relatively to processes where elevated temperatures are required, such as in [Ref. 17, 30].
3. The solid content in suspension is high in comparison with other prior art, in particular [Ref 20], so that evaporation and drying occurs much faster.
4. The dough-like structure for the slabs is obtained by adding much smaller amount of PTFE as compared to other prior art, in particular [Ref. 22], namely 0.25 vs. 2 wt. %, i.e. the negative effect of the polymer on the electrical properties of BPPs is reduced.
5. Softness of the slabs allows them to be rolled to and afterwards molded within a wide range of thickness, where the lower limit reaches 0.05 mm, which is very close to a theoretical value set by dimensions of the biggest components in the compound, i.e. 20 µm (MFG)+25 µm (PPS).
6. The process of making slabs leads to formation of self-organized laminate structure having enhanced mechanical properties that is beneficial compared to prior art, in particular [Ref. 52], where a similar structure is achievable only by means of additional coatings on a core plate.
7. Applying a multi-layer design makes it possible to increase the flexural strength by 40% and, as a consequence, reduce the necessary minimum thickness by 25% for BPPs accepted for assembly in PEM fuel cell stacks, when taking into account strength criteria.
8. Experimentally produced 0.3 mm thick multi-layer BPPs demonstrate extremely high levels of flexural strength at relatively low polymer content, namely 186 MPa at less than 18 wt. % of PPS.
9. The low amount of polymer binder, combined with the thin design, leads to an insignificant contribution of BPP resistance into the total resistance of the fuel cell.

REFERENCES

[1] Lin X, Sabir I. Review of bipolar plates in PEM fuel cells: Flow field designs. Journal of Power Sources 30 (2005) 359
[2] Devrim Y, Albostan A, Devrim H. Experimental investigation of CO tolerance in high temperature PEM fuel cells. International Journal of Hydrogen Energy 43 (2018) 18672
[3] Yan W M, Chen C Y, Liang C H. Comparison of performance degradation of high-temperature PEM fuel cells with different bipolar plates. Energy 186 (2019) 115836
[4] Simaafrookhteh S, Khorshidian M, Momenifar M. Fabrication of multi-filler thermoset-based composite bipolar plates for PEMFCs: Molding defects and properties characterizations. International Journal of Hydrogen Energy 45 (2020) 14119
[5] Guo N, Leu M C. Effect of different graphite materials on the electrical conductivity and flexural strength of bipolar plates fabricating using selective laser sintering. International Journal of Hydrogen Energy 37 (2012) 3558
[6] Singh R S, Gautam A, Rai V. Graphene-based bipolar plates for polymer electrolyte membrane fuel cells. Frontiers of Materials Science 13 (2019) 217
[7] The advanced properties of PPS materials: https://readingplastic.com/pps-materials/
[8] Technical targets: bipolar plates for transportation applications: https://www.energy.gov/eere/fuelcells/doe-technical-targets-polymer-electrolyte-membrane-fuel-cell-components
[9] Yen C Y, Liao S H, Lin Y F, Hung C H, Lin Y Y, Ma M C C. Preparation and properties of high performance nanocomposite bipolar plate for fuel cell. Journal of Power Sources 162 (2006) 309
[10] Rzeczkowski P, Lucia M, Müller A, Facklam M, Cohnen A, Schafer P, Hopmann C, Hickmann T, Pötschke P, Krause B. Development of joining methods for highly filled graphite/PP composite based bipolar plates for fuel cells: Adhesive joining and welding. Proceedings of the 33$^{rd}$ International Conference of the Polymer Processing Society. Cancun, Mexico, Dec. 10-14$^{th}$, 2017
[11] Cunningham B, Baird D G. The development of economical bipolar plates for fuel cells. Journal of Materials Chemistry 16 (2006) 4385
[12] Din R, Arshad M, Saleem A, Shahzad M, Subhani T, Hussain S. Fabrication and characterization of bipolar plates of vinyl ester resin/graphite-based composite for polymer electrolyte membrane fuel cells. Journal of Thermoplastic Composite Materials 29 (2014) 1315
[13] Horizon announces a breakthrough in ultra-thin high-performance graphite bipolar plate technology for fuel cells: https://fuelcellsworks.com/news/horizon-announcea-breakthrough-in-ultra-thin-high-perfor-mance-graphite-bip/
[14] SIGRACELL® bipolar plate: https://www.sglcarbon.com/pdf/SGL-DatasheetSIGRACELL-Bipolar-Plates-EN.pdf
[15] Highly flexible bipolar plates for redox-flow batteries: https://www.umsicht.fraunhofer.de/content/dam/umsicht/en/documents/research-forthe-market/electrically-conductive-polymers/highly-flexible-bipolar-plates-redox-flow-batteries.pdf
[16] U.S. Pat. No. 7,910,501B2 Jiang J, Harada T. Sheet molding material for fuel cell bipolar plate, method for producing same and bipolar plate of fuel cell. U.S. Pat. No. 7,910,501 B2
[17] WO2014/100082A1 Golba J C, Spikowski J, Davison B J, Geng K. Electrically conductive polyphenylene sulfide compounds. WO 2014/100082 A1
[18] U.S. Pat. No. 7,736,786B2 Hong C M, Park S H, Lee Y J. Composition for fuel cell bipolar plate.
[19] Cunningham B D, Baird D G. Development of bipolar plates for fuel cells from graphite-filled wet-lay material and a compatible thermoplastic laminate skin layer. Journal of Power Sources 168 (2007) 418
[20] US2019/0341630A1 Ando H, Suzuki T, Okada A, Koizumi A. Separator for fuel cells and method for producing same.
[21] Torelina™ PPS resin: https://www.toray.jp/plastics/en/torelina/technical/tec_023.html
[22] Gromadskyi D. A method for producing a separator plate for a fuel cell and a method for producing a fuel cell stack with such separator. US 2019/0260037 A1
[23] Gromadskyi D G, Chae J H, Norman S A, Chen G Z. Correlation of energy storage performance of supercapacitor with iso-propanol improved wettability of aqueous electrolyte on activated carbon electrodes of various apparent densities. Applied Energy 159 (2015) 39
[24] Tensile testing of PTFE: https://polyfluoroltd.com/blog/tensile-testing-of-ptfe/
[25] Highly engineered thermoplastic materials: https://www.performanceplastics.com/materials/

[26] Dupont™ Teflon® PTFE DISP 30 fluoropolymer resin: http://download.ceris.purdue.edu/file/3187
[27] SIA comments on the preliminary information on manufacturing, processing, distribution, use, and disposal: N-methylpyrrolidone (NMP): https://www.semiconductors.org/wp-content/uploads/2018/06/SIA-Comments-toEPA-on-N-Methylpyrrolidone-NMP-Mar.-15-2017.pdf
[28] U.S. Pat. No. 5,043,112 Beck H N. Process for forming articles comprising poly(phenylene sulfide) (PPS).
[29] Lequeux F, Talini L, Verneuil E, Delannoy G, Valois P. Wetting of polymers by their solvents. The European Physical Journal E 39 (2016) 12
[30] NMP: https://www.eastman.com/Pages/ProductHome.aspx?product=71103627
[31] U.S. Pat. No. 8,563,681B2 Makita K, Ono T, Takahashi T, Akasaka H, Sakane T. Process for producing fine polyphenylene sulfide resin particles fine polyphenylene sulfide particles, and dispersion thereof.
[32] US2008/0318110A1 Budinski M K, Fuller T J, Dobulis B T. Thermoplastic bipolar plate.
[33] Calleja G, Jourdan A, Ameduri B, Habas J P. Where is the glass transition temperature of poly(tetrafluoroethylene)? A new approach by dynamic rheometry and mechanical tests. European Polymer Journal 49 (2013) 2214
[34] US2015/0367249A1 Miyata K, Kawada T, Katou K. N-methyl-pyrrolidone distilling apparatus.
[35] Sunitha K, Rani K Y, Moulik S, Satyanarayana S V, Sridhar S. Separation of NMP/water mixtures by nanocomposite PEBA membrane: Part I. Membrane synthesis, characterization and pervaporation performance. Desalination 330 (213) 1
[36] Triton™ X-100, ACROS Organics™: https://www.fishersci.com/shop/products/triton-x-100-acros-orga-nics-4/AC215682500
[37] Li X G, Huan M R, Bai H, Yang Y L. High-resolution thermogravimetry of polyphenylene sulfide film under four atmospheres. Journal of Applied Polymer Science 83 (2002) 2053
[38] Cebe P, Chung S. Melting behaviour of high performance composite matrix polymers: Poly(phenylene sulfide) Polymer Composites 11 (1990) 265
[39] Wang H, Ding S, Zhu H, Wang F, Guo Y, Zhang H, Chen J. Effect of scretching ratio and heating temperature on structure and performance of PTFE hollow fiber membrane in VIVID for RO brine. Separation and Purification Technology 126 (2014) 82
[40] Menczel J D, Collins G L. Thermal analysis of poly (phenylene sulfide) polymers I: Thermal characterization of PPS polymers of different molecular weights. Polymer Engineering and Science 32 (1992) 1264
[41] Polyphenylene sulfide (PPS): http://polymerdatabase.com/Commercial %20Polymers/PPS.html Marinho B, Ghislandi M, Tkalya E, Coning C E, With G D. Electrical conductivity of compacts of graphene, multi-wall carbon nanotubes, carbon black and graphite powder. Powder Technology 221 (2012) 351
[43] Mijajlovikj M, Ristetska S, Samakoski B, Stevanovska N. Mathematical model on flexural properties of composite laminates. International Journal of Engineering Research & Technology 6 (2017) 526
[44] Freudenberg gas diffusion layers: https://www.fuelcellstore.com/specsheets/freudenberg-gdl-tech-nical-data.pdf
[45] Yang T, Shi P. Study on the mesocarbon microbeads/polyphenylene sulfide composite bipolar plates applied for proton exchange membrane fuel cells. Journal of Power Sources 175 (2008) 390
[46] Zhang H, Guan, Li T, Yang X. Technology of polyphenylene sulfide (PPS) resin/graphite conductive composite for bipolar plate. Key Engineering Materials 519 (2012) 49
[47] Zhang H, Yang X, Liu X, Wang T. Preparation of CF reinforced PPS/graphite conductive composite for bipolar plate. Advanced Materials Research 875-877 (2014) 1245
[48] Xia L G, Li A J, Wang W Q, Yin Q, Lin H, Zhao Y B. Effects of resin content and preparing conditions on the properties of polyphenylene sulfide resin/graphite composite for bipolar plate. Journal of Power Sources 178 (2008) 363
[49] Annual Book of ASTM Standards 43 (1975) F84
[50] Wang H, Sweikart M A, Turner J A. Stainless steel as bipolar plate material for polymer electrolyte membrane fuel cells. Journal of Power Sources 115 (2003) 243
[51] Standard Test Methods for Flexural Properties of Unreinforced and Reinforced Plastics and Electrical Insulating Material: https://www.astm.org/Standards/D790
[52] US2006/0084750A1 Huang J, Baird D G, McGrath J E. Compression moldable composite bipolar plates with high through-plane conductivity.
[53] WO2018/072803A1 Gromadskyi, Denys. Method of producing separator plates by compaction and a production facility.
[54] U.S. Pat. No. 6,544,680 Shigeru Takano, Kenichi Uehara, Yasunobu Iizuka, Hitomi Hatano. Fuel cell separator, a fuel cell using the fuel cell separator, and a method for making the fuel cell separator
[55] U.S. Pat. No. 6,803,139 Kazuo Saito, Atsushi Hagiwara, Yasuo Imashiro, Naofumi Horie, Fumio Tanno, Tsutomu Uehara. Electrically conductive resinous composition, fuel cell separator and production thereof, and polymer electrolyte fuel cell
[56] EP1758185 Kazuhito Hatoh, Teruhisa Kanbara, Soichi Shibata, Eiichi Yasumoto, Shigeyuki Unoki, Tatsuo Nagasaki, Masatoshi Teranishi, Tsutomu Kawashima, Toru Sukawa, Yasuo Takebe. Polyelectrolyte fuel cell-use separator, polyelectrolyte fuel cell, method of evaluating polyelectrolyte fuel cell-use separator, and production method of polyelectrolyte fuel cell-use separator
[57] US2005/0042496 Mukesh Bisara, Yuqi Cai, Divya Chopra, Alistair Mollison, John Fisher. Method for manufacturing fuel cell separator plates under low shear strain.
[58] CN111048800A. A bipolar plate and preparation method thereof and a fuel cell.
[59] U.S. Pat. No. 7,887,927 Jang Boz Z, Guo Jiusheng, Zhama Aruna. Highly conductive multilayer composite precursor composition to fuel cell flow field plate or bipolar plate.
[60] US2014/087287 Shunya Suzuki, Tadashi Iino, Zenichiro Izumi. Method for manufacturing fuel cell separator.
[61] US2019/341630 Hitoshi Ando, Tsutomu Suzuki, Masaru Yoneyama, Akira Okada, Akihiro Koizumi. Separator for fuel cells and method for producing same.
[62] US2009/152105 Anthony B. LaConti, William A. Titterington, Larry L. Swette, Ricardo Leon, Kwang S. Kim. Proton exchange membrane (PEM) electrochemical cell having an integral electrically-conductive, resiliently compressible, porous pad.
[63] CN101174695A Congsheng Guan; Huayong Zhang; Ziqiang Li. Double polar plate used for phosphoric acid type fuel cell and method for producing the same.

[64] WO2008/075812 Sung Jun Kim, Chang Min Hong. Hydrophilic carbon black aggregate, its preparation process, hydrophilic composite material and bipolar plate for fuel cell comprising it.
[65] US2018/0358630 Woo, Jong Seok; Lee, Mun Hee; Oh, Sung Moon; Ju, Hong Beom; Park, Kwang Sang; Park, Sung Hoon. Bipolar plate for fuel cell having controlled structure of carbon materials and method for manufacturing the same.
[66] US2004/033413 YOON JONG-JIN,; LIM IL-JI,; SAITOH AKIHISA: Polymer electrolyte membrane fuel cell.
[67] US2017298200 YI Jee Sung; LEE Hyun Chul; YOON Joon Young; CHO Eun Jeong; KANG Chung Seock; Yi, Jee Sung; Lee, Hyun Chul; Yoon, Joon Young; Cho, Eun Jeong; Kang, Chung Seock. Thermoplastic prepreg intermediate material for fuel cell separation plate and method for manufacturing thermoplastic prepreg for fuel cell separation plate by using the same.

The invention claimed is:

1. A separator plate for a fuel cell, wherein the separator plate is made from a moldable, malleable, precursor sheet by hot-compression molding of a single layer precursor sheet of thickness X1 into an electrically conductive, rigid single layer separator plate of thickness X2 in the range of 0.05-0.6 mm, wherein the precursor sheet and the separator plate provided as a single polymer matrix that comprises only a single thermoplastic polymer blend in which carbon fibers and electroconductive carbon particles are dispersed; wherein the thermoplastic polymer blend comprises polytetrafluoroethylene, PTFE, and a thermoplastic polymer different from PTFE; wherein the carbon fibers have an average length L that is larger than the thickness X1 of the layer, wherein L is in the range of 0.1-1 mm, wherein the weight concentration of PTFE is at least 0.05 wt. % but less than 0.5 wt. % PTFE, the weight concentration of the thermoplastic polymer different from PTFE is 5-30 wt. %, and the weight concentration of the carbon fibers is in the range of 2-20 wt. %, the weight concentrations being relatively to the total weight of the polymer blend, carbon fibers and electroconductive carbon particles.

2. The precursor sheet according to claim 1, wherein the carbon fibers have an average length L that is at least twice as large as the thickness X1 of the layer.

3. The precursor sheet according to claim 2, wherein the precursor sheet is formed as a single layer with a thickness X1 is in the range of at least 0.05 mm.

4. The precursor sheet according to claim 1, wherein the electroconductive carbon particles in the thermoplastic polymer blend comprises at least a first and a second portion, wherein the carbon particles of the first portion are graphite particles with an average size in the range of 10-100 μm, and wherein the carbon particles of the second portion have a size in the range of 0.1-10 μm, wherein the weight concentration of the first portion is in the range of 50-90 wt. % relatively to the total weight of the polymer blend, carbon fibers and electroconductive carbon particles, and wherein the weight ratio between the first and the second portion of electroconductive carbon particles is in the range of 5-20.

5. The precursor sheet according to claim 1, wherein the thermoplastic polymer different from PTFE is PPS.

6. A method of producing a separator plate by a precursor, the method comprising,
mixing a powder of thermoplastic polymer, and a powder of carbon fibers, and electroconductive carbon particles in a dispersion to provide a thermoplastic polymer blend in which carbon fibers and electroconductive carbon particles are dispersed, wherein the carbon fibers have an average length of L in the range of 0.1-1 mm; wherein the thermoplastic polymer is a blend that comprises polytetrafluoroethylene, PTFE, and a second thermoplastic polymer, wherein the second thermoplastic polymer is different from PTFE; wherein the weight concentration of PTFE is at least 0.05 wt. % but less than 0.5 wt. % PTFE, the weight concentration of the thermoplastic polymer different from PTFE is 5-30 wt. %, and the weight concentration of the carbon fibers is in the range of 2-20 wt. %, the weight concentrations being relatively to the total weight of the polymer blend, carbon fibers and electroconductive carbon particles;
forming a single-layer moldable malleable precursor sheet of thickness X1 from the mix by calender rolling in a forming station and causing the carbon fibers to be at least partially parallel with the slab by to the rolling;
hot-compression molding the single-layer precursor sheet into a single layer separator plate of a thickness of X2 in the range of 0.05-0.6 mm, wherein X2 is less than the average length L of the carbon fibers, wherein L is larger than the thickness X1 of the layer and in the range of 0.1-1 mm, wherein the single layer separator plate consists of single polymer matrix that comprises only a single thermoplastic polymer blend in which carbon fibers, and electroconductive carbon particles are dispersed; wherein the molding is made at temperatures between melting temperatures of the PTFE and the second thermoplastic polymer.

7. The method according to claim 6, wherein the method comprises providing the carbon fibers with an average length L that is at least twice as large as the thickness X2 of the layer.

8. The method according to claim 6, wherein the second thermoplastic polymer is polyphenylene sulfide, PPS.

9. The method according to claim 6, the method comprising:
providing an aqueous dispersion, the aqueous dispersion comprising PTFE particles, carbon fibers;
providing a solvent dispersion, the solvent dispersion comprising carbon black particles and particles of the second thermoplastic polymer, dispersed in an organic solvent;
stirring both dispersions for preventing sedimentation of the particles;
combining and mixing together the two dispersions;
only after mixing together the two dispersions, mixing a portion of graphite particles with the two dispersions to provide a mix, the graphite particles of the portion having an average size in the range of 10-100 μm; wherein the portion has a weight which is 5-20 times larger than the weight of the carbon black;
after adding the graphite particles, kneading the mix in a kneader;
during kneading in the kneader, raising the temperature to elevated temperature levels for evaporating the organic solvent and water from the mix, wherein the elevated temperature levels are above the glass transition temperature of PTFE,
after evaporation of the organic solvent and water and while the second thermoplastic polymer is in a molten state but not the PTFE, forming the mix into a precursor sheet in the forming station.

10. The method according to claim 9, wherein the portion of graphite particles that is added to the two dispersions only after their mixing is a second portion of graphite particles, and wherein the method comprises providing the aqueous dispersion so that it contains a first portion of graphite particles prior to mixing of the two dispersion; wherein the graphite particles of the first portion have an average particle size in the range of 0.1-10 µm.

11. The method according to claim 9, wherein the elevated temperature levels during the kneading in the kneader are below the melting temperatures of the PTFE and the second thermoplastic polymer; wherein the method comprises extracting the mix from the kneader, and then raising the temperature of the mix to a level sufficiently high to melt the second thermoplastic polymer before forming the sheet into a precursor sheet with thickness X1 in the forming station.

12. The method according to claim 11, wherein the providing of the aqueous dispersion comprises adding a surfactant to the aqueous dispersion, wherein the surfactant has a boiling temperature above the boiling temperature of water and above the boiling temperature of the organic solvent; wherein the method comprises extracting the mix from the kneader while the mix contains the surfactant but neither the solvent nor water, and then raising the temperature of the mix to a level sufficiently high to evaporate the surfactant prior to forming the sheet into a slab with thickness X1 in the forming station.

13. The method according to claim 6, wherein the method comprises calender rolling the precursor sheet in at least two different directions for aligning the carbon fibers in different directions.

14. A rigid, rolled and press-molded separator plate for a fuel cell, wherein the separator plate is formed as a single layer from a single layer precursor sheet, wherein the single layer has a thickness X2 in the range of 0.05-0.6 mm, for example 0.05-0.3 mm, and is provided as a polymer matrix that comprises a thermoplastic polymer blend in which carbon fibers and electroconductive carbon particles are dispersed; wherein the thermoplastic polymer blend comprises PTFE and a thermoplastic polymer different from PTFE, for example PPS; wherein the carbon fibers have an average length L that is in the range of 0.1-1 mm and larger than the thickness X2 of the layer; wherein the weight concentration of PTFE is at least 0.05 wt. % but less than 0.5 wt. % PTFE and wherein the weight concentration of the thermoplastic polymer different from PTFE, for example PPS, is 5-30 wt. %, relatively to the total weight of the polymer blend, carbon fibers and electroconductive carbon particles.

15. The separator plate according to claim 14, wherein the carbon fibers have an average length L that is at least twice as large as the thickness X2 of the layer.

16. The separator plate according to claim 14, wherein the weight concentration of the carbon fibers is in the range of 5-20 wt. % relative to the total weight of the polymer blend, carbon fibers, and electroconductive carbon particles.

17. The separator plate according to claim 14, wherein the electroconductive carbon particles in the thermoplastic polymer blend comprises at least a first and a second portion, wherein the carbon particles of the first portion are graphite particles with an average size in the range of 10-100 µm, and wherein the carbon particles of the second portion have a size in the range of 0.1-10 µm, wherein the weight concentration of the first portion is in the range of 50-90 wt. % relatively to the total weight of the polymer blend, carbon fibers and electroconductive carbon particles, and wherein the weight ratio between the first and the second portion of electroconductive carbon particles is in the range of 5-20.

18. A fuel cell with a separator plate according to claim 14.

19. A fuel cell with a separator plate provided as a hot-press-molded plate from a precursor sheet according to claim 1.

* * * * *